(12) United States Patent
Bocklet et al.

(10) Patent No.: US 10,043,521 B2
(45) Date of Patent: Aug. 7, 2018

(54) USER DEFINED KEY PHRASE DETECTION BY USER DEPENDENT SEQUENCE MODELING

(71) Applicant: INTEL IP CORPORATION, Santa Clara, CA (US)

(72) Inventors: Tobias Bocklet, Munich (DE); Josef G. Bauer, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/201,016

(22) Filed: Jul. 1, 2016

(65) Prior Publication Data

US 2018/0005633 A1    Jan. 4, 2018

(51) Int. Cl.
| | | |
|---|---|---|
| G10L 15/22 | (2006.01) | |
| G10L 15/00 | (2013.01) | |
| G10L 17/00 | (2013.01) | |
| G10L 21/00 | (2013.01) | |
| G06F 17/00 | (2006.01) | |
| G10L 17/04 | (2013.01) | |
| G10L 17/18 | (2013.01) | |
| G10L 17/02 | (2013.01) | |
| G10L 17/24 | (2013.01) | |
| G10L 17/14 | (2013.01) | |

(52) U.S. Cl.
CPC .............. *G10L 17/04* (2013.01); *G10L 17/02* (2013.01); *G10L 17/14* (2013.01); *G10L 17/18* (2013.01); *G10L 17/24* (2013.01)

(58) Field of Classification Search
None
See application file for complete search history.

(56) References Cited

U.S. PATENT DOCUMENTS

| | | | |
|---|---|---|---|
| 5,384,893 A * | 1/1995 | Hutchins | ................. G10L 13/08 704/258 |
| 6,138,095 A | 10/2000 | Gupta et al. | |
| 6,205,424 B1 | 3/2001 | Goldenthal et al. | |
| 7,139,714 B2 | 11/2006 | Bennett et al. | |
| 7,457,748 B2 | 11/2008 | Nefti et al. | |
| 7,487,091 B2 | 2/2009 | Miyazaki | |
| 7,603,278 B2 | 10/2009 | Fukada et al. | |
| 7,720,683 B1 * | 5/2010 | Vermeulen | .............. G10L 15/22 704/235 |
| 8,255,215 B2 | 8/2012 | Li et al. | |

(Continued)

OTHER PUBLICATIONS

Chen et al., "Small-Footprint Keyword Spotting Using Deep Neural Networks", 2014 IEEE International Conference on Acoustics, Speech and Signal Processing (ICASSP), May 4-9, 2014; pp. 4087-4091.

(Continued)

*Primary Examiner* — Fariba Sirjani
(74) *Attorney, Agent, or Firm* — Green, Howard, & Mughal LLP.

(57) ABSTRACT

Techniques related to key phrase detection for applications such as wake on voice are discussed. Such techniques may include determining a sequence of audio units for received audio input representing a user defined key phrase, eliminating audio units from the sequence to generate a final sequence of audio units, and generating a key phrase recognition model representing the user defined key phrase based on the final sequence.

20 Claims, 11 Drawing Sheets

(56) References Cited

U.S. PATENT DOCUMENTS

| | | | |
|---|---|---|---|
| 8,527,271 | B2 | 9/2013 | Wandinger et al. |
| 8,818,802 | B2 | 8/2014 | Fastow et al. |
| 9,070,367 | B1 | 6/2015 | Hoffmeister |
| 9,299,338 | B2 | 3/2016 | Kato |
| 9,368,105 | B1 | 6/2016 | Freed et al. |
| 9,401,140 | B1 | 7/2016 | Weber et al. |
| 9,484,030 | B1* | 11/2016 | Meaney ................. G10L 15/22 |
| 9,646,613 | B2 | 5/2017 | Blouet |
| 2002/0087314 | A1 | 7/2002 | Fischer et al. |
| 2007/0285505 | A1* | 12/2007 | Korneliussen ......... H04N 7/147 |
| | | | 348/14.08 |
| 2008/0281599 | A1* | 11/2008 | Rocca ............... G06F 17/30017 |
| | | | 704/270 |
| 2010/0198598 | A1 | 8/2010 | Herbig et al. |
| 2010/0324900 | A1 | 12/2010 | Faifkov et al. |
| 2012/0166194 | A1 | 6/2012 | Jung et al. |
| 2012/0245934 | A1 | 9/2012 | Talwar et al. |
| 2013/0289994 | A1 | 10/2013 | Newman et al. |
| 2014/0025379 | A1 | 1/2014 | Ganapathiraju et al. |
| 2014/0058731 | A1 | 2/2014 | Tyagi et al. |
| 2014/0079297 | A1 | 3/2014 | Tadayon |
| 2014/0129224 | A1 | 5/2014 | Chien |
| 2014/0136200 | A1 | 5/2014 | Winter et al. |
| 2014/0172428 | A1 | 6/2014 | Han |
| 2014/0200890 | A1 | 7/2014 | Kurniawati et al. |
| 2014/0278435 | A1 | 9/2014 | Ganong et al. |
| 2014/0337030 | A1 | 11/2014 | Lee et al. |
| 2014/0337031 | A1 | 11/2014 | Kim et al. |
| 2014/0358539 | A1 | 12/2014 | Rao et al. |
| 2015/0025890 | A1 | 1/2015 | Jagatheesan et al. |
| 2015/0066495 | A1 | 3/2015 | Zhang et al. |
| 2015/0073795 | A1 | 3/2015 | Tan |
| 2015/0081296 | A1 | 3/2015 | Lee et al. |
| 2015/0095027 | A1 | 4/2015 | Parada San Martin et al. |
| 2015/0154953 | A1 | 6/2015 | Bapat et al. |
| 2015/0279358 | A1 | 10/2015 | Kingsbury et al. |
| 2015/0302847 | A1 | 10/2015 | Yun et al. |
| 2015/0340032 | A1 | 11/2015 | Gruenstein |
| 2015/0371631 | A1 | 12/2015 | Weinstein et al. |
| 2015/0371633 | A1 | 12/2015 | Chelba |
| 2016/0066113 | A1 | 3/2016 | Elkhatib et al. |
| 2016/0071516 | A1 | 3/2016 | Lee et al. |
| 2016/0098999 | A1 | 4/2016 | Jacob et al. |
| 2016/0111086 | A1 | 4/2016 | Ziolko et al. |
| 2016/0180839 | A1 | 6/2016 | Tomita |
| 2016/0188573 | A1 | 6/2016 | Tang |
| 2016/0189706 | A1* | 6/2016 | Zopf .................... G10L 15/063 |
| | | | 713/320 |
| 2016/0379632 | A1 | 12/2016 | Hoffmeister et al. |
| 2016/0379638 | A1* | 12/2016 | Basye ............... G06F 17/30764 |
| | | | 704/235 |
| 2017/0004824 | A1* | 1/2017 | Yoo .................... G06F 17/2818 |
| 2017/0133038 | A1* | 5/2017 | Jiang .................... G10L 15/187 |
| 2017/0294188 | A1* | 10/2017 | Hayakawa ............. G10L 15/01 |

OTHER PUBLICATIONS

Rose et al., "A Hidden Markov Model Based Keyword Recognition System", 1990 ICASSP-90, vol. 1, 1990 International Conference on Acoustics, Speech, and Signal Processing, Apr. 3-6, 1990; pp. 129-132.

Zhang et al., "Unsupervised Spoken Keyword Spotting via Segmental DTW on Gaussian Posteriorgrams", in Proceedings of Automatic Speech Recognition & Understanding Workshop (ASRU 2009), IEEE, Merano, Dec. 2009; pp. 398-403.

International Search Report & Written Opinion dated Apr. 28, 2017 for PCT Patent Application No. PCT/US17/14435.

Non-Final Office Action dated Jun. 5, 2017 for U.S. Appl. No. 15/057,695.

Notice of Allowance for U.S. Appl. No. 14/950,670, dated Jun. 22, 2017.

International Search Report and Written Opinion for International Patent Application No. PCT/US2016/049909, dated Dec. 22, 2016.

Non-Final Office Action for U.S. Appl. No. 14/950,670, notified on Feb. 17, 2017.

Notice of Allowance for U.S. Appl. No. 15/057,695, dated Jan. 24, 2018.

* cited by examiner

USER DEFINED KEY PHRASE DETECTION BY USER DEPENDENT SEQUENCE MODELING

BACKGROUND

Key phrase or hot word detection systems may be used to detect a word or phrase or the like, which may initiate an activity by a device. For example, the device may wake (e.g., transition from a low power or sleep mode to an active mode) based on the detection of a particular word or phrase. Such wake-on-voice or key phrase detection systems may focus on detection of a specified user independent phrase. It is the goal of such systems to minimize false rejects (e.g., falsely rejecting a correct phrase) and false accepts (e.g., falsely accepting a wrong phrase). In particular, such false accepts may be more likely to occur when a portion of an uttered phrase matches or is phonetically similar to the key phrase while another portion of the uttered phrase does not match or is not phonetically similar.

Existing techniques may provide limited flexibility as the implemented key phrase is user independent. Furthermore, existing techniques may have relatively high error rates. Such problems may become critical as the desire to implement key phrase detection systems such as wake on voice systems becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
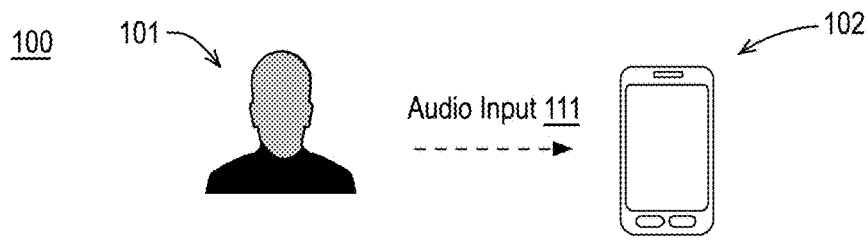
FIG. 1 is an illustrative diagram of an example setting for providing user dependent key phrase enrollment and/or detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to enrolling and/or implementing a user defined key phrase for key phrase detection.

As described above, key phrase or hot word detection systems may be used to detect a word or phrase or the like, which may initiate an activity by a device such as waking the device from a low power or sleep mode to an active mode based on detection of the key phrase. Current techniques may be limited to providing user independent or predetermined key phrases or hot words or the like. As used herein, the term key phrase may indicate any audio indicator or acoustic event to be detected such as a phrase, a word, or a group of phones or phonetic units, or the like. Furthermore, as discussed herein, the key phrase may be user defined for use by the system such that a key phrase detection model is built or generated based on the user defined key phrase as uttered by the user during an enrollment phase. As used herein the term user defined includes both key phrases thought of by the user and those that are recommended to the user for use by the system. The system may then detect, based on an utterance received after implementing the key phrase detection model, whether the user defined key phrase has been detected.

In some embodiments, to enroll a user defined key phrase, a user is prompted by a device or system to utter the user defined key phrase. An audio input representing the user defined key phrase is received by a microphone of the device and translated to audio data (e.g., a digital representation of the audio input). Based on the audio data, a sequence of audio units corresponding to a received audio input is determined. The audio units may include sub-phonetic units (e.g., senones), silence units, noise units, or the like. For example, for frames of the audio input, corresponding audio units may be determined by extracting feature vectors for the frames and decoding the feature vectors using an acoustic model to determine most probable audio units corresponding to the frames. The sequence of most probable units includes a sequence of most likely audio units as determined by the acoustic model. The sequence of audio units represents the received utterance and includes sub-phonetic units corresponding to a representation of speech, to audio units representing silence, audio units representing noise, or the like.

The sequence of most probable audio units is then processed (e.g., post processed) to generate a final sequence of audio units. Such post processing may trim the sequence of audio units by eliminating one or more of the audio units from the sequence. For example, consecutive matching sub-phonetic units (e.g., audio units representing speech) may be merged to a single sub-phonetic unit (e.g., one or more repetitive consecutive matching sub-phonetic units may be eliminated), audio units corresponding to silence may be eliminated unless a particular number of audio units corresponding to silence occur (e.g., consecutive silence units are only kept if there are N of them consecutively with N being five or the like), and/or sub-phonetic units between blocks of silence audio units may be eliminated unless a particular number of the (non-silence) sub-phonetic units occur (e.g., sub-phonetic units between silence sub-phonetic units are only kept if there are M of them consecutively with M being three or the like).

The final or post-processed sequence of sub-phonetic units is then used to generate a key phrase recognition model representing the user defined key phrase. For example, the final or post-processed sequence of sub-phonetic units provides a key phrase model (e.g., a HMM-sequence model) for the user defined key phrase. The key phrase recognition model includes a single rejection state having a transition to the key phrase model. The key phrase model includes multiple states having transitions between the states. Furthermore, the last state of the key phrase model may be characterized as a final state of the key phrase model. Such techniques may provide enrollment of a user defined key phrase to generate a key phrase recognition model.

During implementation, an audio input is received for evaluation by the key phrase recognition model. Based on the audio input, a time series of scores of audio units is generated based on a time series of feature vectors representative of the second audio input. For example, feature vectors may be extracted from the audio input during implementation. The feature vectors may be extracted in the same manner as used to generate the key phrase recognition model. Furthermore, an acoustic model (e.g., the same acoustic model used to generate the key phrase recognition model or a pruned version of the acoustic model or the like) may be evaluated to generate a time series of scores of audio units including sub-phonetic units representing speech. For example, the scores needed to score the previously enrolled key phrase recognition model are attained form the acoustic model (e.g., DNN) outputs corresponding to the transitions of the previously enrolled key phrase recognition model. Based on the time series of scores of audio units, the key phrase recognition model is scored (e.g., at each time instance over time) to generate a rejection likelihood score and a key phrase likelihood score. For example, the rejection likelihood score corresponds to the single rejection state and the key phrase likelihood score corresponds to the final state of the key phrase model. Using the rejection likelihood score and the key phrase likelihood score, a determination may be made (e.g., again at each time instance over time) as to whether the user defined key phrase has been detected. For example, determining whether the audio input corresponds to the user defined key phrase may include determining a log likelihood score based on the rejection likelihood score and the key phrase likelihood score and comparing the log likelihood score to a threshold.

If the user defined key phrase was not detected, processing continues over time for captured audio as the scores key phrase recognition model are updated and the determination is made as to whether the user defined key phrase has been detected. If the user defined key phrase was detected, the device or system responds to the detection by, for example, waking from a low power state, executing a command, or the like.

Such techniques may provide for the implementation of a user defined or user dependent key phrase. The implementation of a user defined key phrase may be automatic and may therefore provide a user-friendly user defined key phrase detection system. Such techniques may be implemented with low resource usage by the device or system both in terms of computation and memory. As discussed further herein, a Hidden Markov Model (HMM) may be modeled in a user defined manner such that, during an enrollment procedure, a user (e.g., a speaker) defines their own key phrase by speaking into the device or system. The received speech signal or data is used to build a user dependent key phrase recognition model (e.g., a user dependent recognition graph).

The discussed user defined key phrase implementations offer advantages in terms of accuracy. For example, compared to user independent key phrase implementations, user dependent key phrases may offer significantly lower false accept and/or reject rates in most or all noise conditions (e.g., quiet, background speech, a single background speaker, auto environment, etc.) where key phrase recognition is implemented. User defined key phrase implementations are also superior when the speaker has an accent that might not be well recognized in a user independent approach. Additionally, a user defined key phrase is user friendly and flexible since each user can select their own key phrase. Furthermore, as is discussed herein, acoustic modeling to generate audio units such as sub-phonetic units corresponding to received audio input may be performed (based on extracted feature vectors) using a neural network such as a deep neural network (DNN). Such DNN techniques offer improved accuracy in the context of user dependent key phrase implementations over other models such as Gaussian Mixture Models (GMMs).

FIG. 1 is an illustrative diagram of an example setting 100 for providing user dependent key phrase enrollment and/or detection, arranged in accordance with at least some implementations of the present disclosure. As shown in FIG. 1, setting 100 may include a user 101 providing audio input 111 to a device 102. For example, user 101 may be enrolling one or more user dependent key phrases for implementation by device. User 101 may enroll a single key phrase or user 101 may enroll multiple key phrases. For example, a single key phrase may be used to wake a device (e.g. "wake device"), another key phrase may be used for a first command (e.g., "open email"), yet another key phrase may be used for a second command (e.g., "play music"), and so on. Furthermore, for such key phrases, the key phrase may be enrolled once or multiple times. For example, for a single key phrase to a wake a device, the same user dependent key phrase may be enrolled three times (or the like) with three separate utterances of the same key phrase such that different key phrase models are generated for each utterance of the same key phrase. Although discussed with respect to a single user 101 enrolling key phrases, multiple different users may enroll different phrases. Each of the models may be implemented and, if a key phrase is detected by any of them, the corresponding command or operation may be employed by device 102. In the key phrase recognition model (as is discussed further herein), a single rejection state may transition to each of the different key phrase models. Such embodiments may improve the robustness in detecting the user dependent key phrase represented by such multiple key phrase models. Furthermore, during implementation, user defined key phrases and user independent key phrases may be implemented in parallel.

Furthermore, subsequent to enrollment, device 102 may be in a deep sleep or power saving mode or the like and user 101 may be attempting to wake device 102 via key phrase detection based on the previously enrolled key phrase or phrases. Or, again subsequent to enrollment, device 102 may be operating and user 101 may be attempting to have device 102 perform a command via key phrase detection based on the previously enrolled key phrase or phrases. If user 101 provides audio input 111 that is identified as the key phrase of device 102, device 102 may wake from a sleep or power saving mode, perform a command, or the like. For example, device 102 may thereby provide an automatic wake on voice or command on voice capability for user 101. As shown, device 102 may be a smartphone. However, device 102 may be any suitable device such as a computer, a laptop, an ultrabook, a smartphone, a tablet, a phablet, a wearable device such as a smart watch or eye glasses, or the like. In any case, device 102 may be described as a computing device as used herein.

Figure 2:
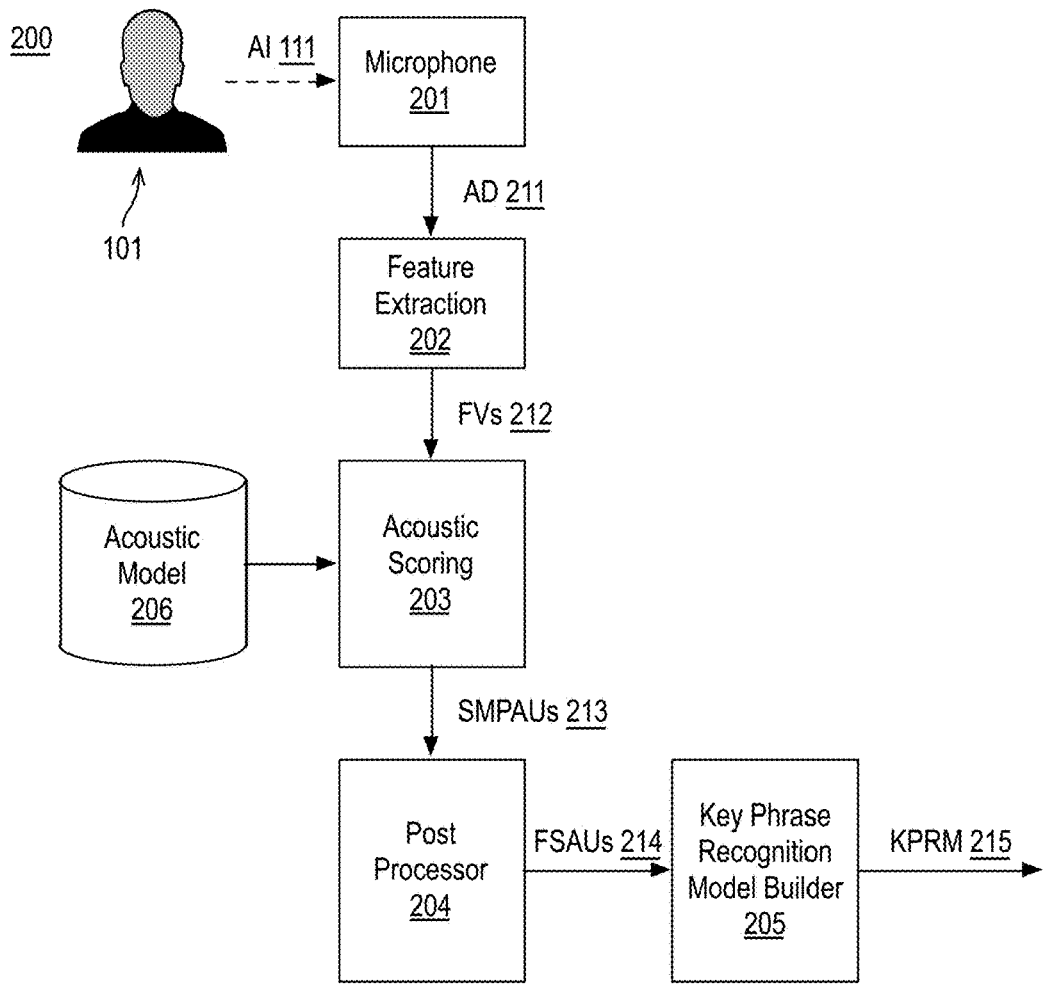
FIG. 2 is an illustrative diagram of an example system for providing user dependent key phrase enrollment.

FIG. 2 is an illustrative diagram of an example system 200 for providing user dependent key phrase enrollment, arranged in accordance with at least some implementations of the present disclosure. For example, system 200 may be implemented by device 102. As shown in FIG. 2, system 200 may include a microphone 201, a feature extraction module 202, an acoustic scoring module 203, a post processor 204, and a key phrase recognition model builder 205. For example, as shown in FIG. 2, acoustic scoring module 203 may generate a sequence of most probable audio units (SMPAUs) 213 based on audio input such that sequence of most probable audio units 213 provides most likely sub-phonetic units, silence units, and/or noise units as uttered by user 101 for enrollment of a user dependent key phrase. As used herein, audio units may include sub-phonetic units of speech, silence units, or noise units. Sequence of most probable audio units 213 are post processed by post processor 204 to generate a final sequence of audio units (FSAUs) 214 such that the post processing eliminates or removes one or more of the audio units from sequence of most probable audio units 213 as is discussed further herein. In some examples, silence audio units may be left in sequence of most probable audio units 213 and/or added to sequence of most probable audio units 213. For example, silence audio units (e.g., of the same or different types) may be combined to a silence that is included in the final sequence of audio units 214. A key phrase recognition model 215 is then built or generated based on final sequence of audio units 214 by key phrase recognition model builder 205 for implementation during a key phrase recognition phase.

In some embodiments, system 200 may generate a single final sequence of audio units 214 for the generation of key phrase recognition model 215. In other embodiments, system 200 may generate multiple final sequences of audio units 214 for the generation of a single key phrase recognition model 215 or system 200 may generate multiple final sequences of audio units 214 for the generation of multiple key phrase recognition models 215. Such techniques are discussed further with respect to FIGS. 8-10 and elsewhere herein.

As shown, microphone 201 may receive audio input (AI) 111 from user 101 for enrollment of a user defined key phrase. Ideally, audio input 111 is received in a training environment such that background noise is eliminated or reduced. Audio input 111 may be characterized as audio, input audio, an input speech stream, or the like. Microphone 201 may receive audio input 111 (e.g., as sound waves in the air) and convert audio input 111 to an electrical signal such as a digital signal to generate audio data (AD) 211. For example, audio data 211 may be stored in memory (not shown in FIG. 2), transferred for continued processing, or the like.

As discussed, feature extraction module 202 may receive audio data 211. For example, feature extraction module 202 may receive audio data 211 from microphone 201, from memory storage of system 200, or the like and feature extraction module 202 may generate feature vectors 212 associated with audio input 111. Feature vectors 212 may be any suitable features or feature vectors or the like representing audio input 111. For example, feature vectors 212 may be a time series of feature vectors (e.g., feature vectors each generated for an instance of time) such that each of feature vectors 212 includes a stack of features or feature vectors each from an instance of time such as a sampling time or the like.

Figure 3:
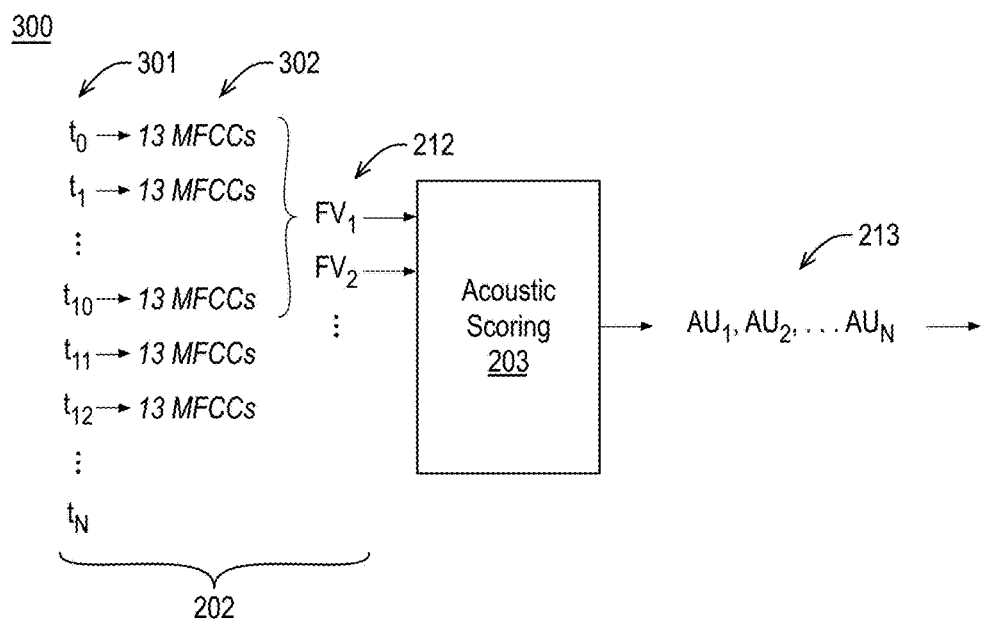
FIG. 3 illustrates example data structures associated with enrollment of a user defined key phrase.

FIG. 3 illustrates example data structures 300 associated with enrollment of a user defined key phrase, arranged in accordance with at least some implementations of the present disclosure. As shown in FIG. 3, feature extraction module 202 may generate feature vectors 212. At each of multiple sampling times 301 (e.g., represented as sampling times $t_0, t_1, \ldots, t_N$), sampling coefficients 302 such as Mel frequency cepstrum coefficients (MFCCs) or the like may be generated. For example, each of sampling times 301 may correspond to a frame of a plurality of frames of audio input 111 and/or audio data 211. For each of sampling times 301 (and corresponding frames or feature frames), sampling coefficients 302 are generated.

Sampling times 301 may be at any suitable interval such as every 10 ms or the like and the sampling performed at each sampling time of sampling times 301 may sample any duration of input speech or audio such as 25 ms of audio or the like. Sampling coefficients 302 may include any number of sampling coefficients such as 13 coefficients as in the illustrated example. Furthermore, sampling coefficients 302 may each be referred to as features, a feature vector, a sampling, or the like. For example, sampling coefficients 302 may be coefficients representing a power spectrum of the received audio. As discussed, in an embodiment, sampling coefficients 302 are Mel frequency cepstrum coefficients representing a power spectrum of the received audio. For example, with reference to FIG. 2, Mel frequency cepstrum coefficients may be determined based on audio input 111 (e.g., via audio data 211) by taking a Fourier transform of audio data 211 and/or audio received via microphone 201, mapping to the Mel scale, determining logs of the powers at each Mel frequency, and determining the Mel frequency cepstrum coefficients based on a discrete cosine transform (DCT) of the logs of the powers.

With continued reference to FIG. 3, sampling coefficients 302 may be stacked or concatenated or combined or the like to generate feature vectors 212. As shown, in an embodiment, 11 instances of sampling coefficients 302 may be combined to generate each feature vector of feature vectors 212. Furthermore, prior to stacking, sampling coefficients 302 may be normalized or the like. For example, Mel frequency cepstrum coefficients may be processed by cepstral mean normalization or the like to generate sampling coefficients 302. As shown, in an embodiment, 11 instances of sampling coefficients 302 may be combined to generate each feature vector such that each feature vector is a 143 (e.g., 11×13) dimensional vector. However, any number of instances of sampling coefficients 302 may be combined or stacked to generate feature vectors 212. As shown, feature vector $FV_1$ may include sampling coefficients associated with times $t_0$-$t_{10}$. Furthermore, feature vector $FV_2$ may include sampling coefficients associated with times $t_1$-$t_{11}$, feature vector $FV_3$ may include sampling coefficients associated with times $t_2$-$t_{12}$, and so on such that adjacent feature vectors have overlap with respect to sampling coefficients 302 that are included therein.

As shown in FIGS. 2 and 3, feature vectors 212 may be provided to acoustic scoring module 203. Acoustic scoring module 203 may score feature vectors 212 based on acoustic model 206 as received via memory and provide sequence of most probable audio units 213 based on feature vectors 212. For example, sequence of most probable audio units 213 may include, for each of sampling times 301, a most probable audio unit from an array of pre-defined audio units including sub-phonetic units used to model speech, silence units, optional noise units, or the like. Such audio units may be indexed and sequence of most probable audio units 213 may provide a time series of index values representative of received audio input 111 such that each index values refers to or indexes an audio unit. Acoustic scoring module 203 may implement any suitable acoustic model 206. In an embodiment, acoustic model 206 may be a deep neural network (DNN) pretrained based on a training set of audio. In an embodiment, acoustic model 206 may be a deep neural network having any number of outputs such as 4,000 outputs or the like.

For example, the outputs of acoustic scoring module 203 (e.g., sequence of most probable audio units 213) may include sub-phonetic units (e.g., senones) such as tied context-dependent triphone states to model speech (as well as silence audio units and, optionally noise audio units). Such tied context-dependent triphone states may represent monophones tied to monophones on either side (e.g., left and right) to generate tied context-dependent triphones. A language, for example, may have a number of monophones (e.g., 30-50 monophones) and sub-phonetic units such as exemplary tied context-dependent triphone states may include each of such monophones in a variety of contexts such that various other monophones are before and after such monophones to generate many combinations (e.g., the sub-phonetic units). Acoustic scoring module 203 may, based on feature vectors 212, provide probabilities or scores or the like associated with such sub-phonetic units (e.g., probabilities as to which unit or phone has been spoken) as well as probabilities or scores associated with silence (e.g., silence units) and/or noise (e.g., noise units) or the like. For example, at each time instance of sampling times 301, a probability is provided for each of such audio units. Sequence of most probable audio units 213 is, then, the sequence of the audio unit having the highest probability at each time instance (e.g., corresponding to each frame). In the example of FIG. 3, such highest probability audio units are labeled $AU_1, AU_2, \ldots AU_N$. In some instances, one or more of $AU_1, AU_2, \ldots AU_N$ may be the same senone (e.g., DNN output).

Figure 4:
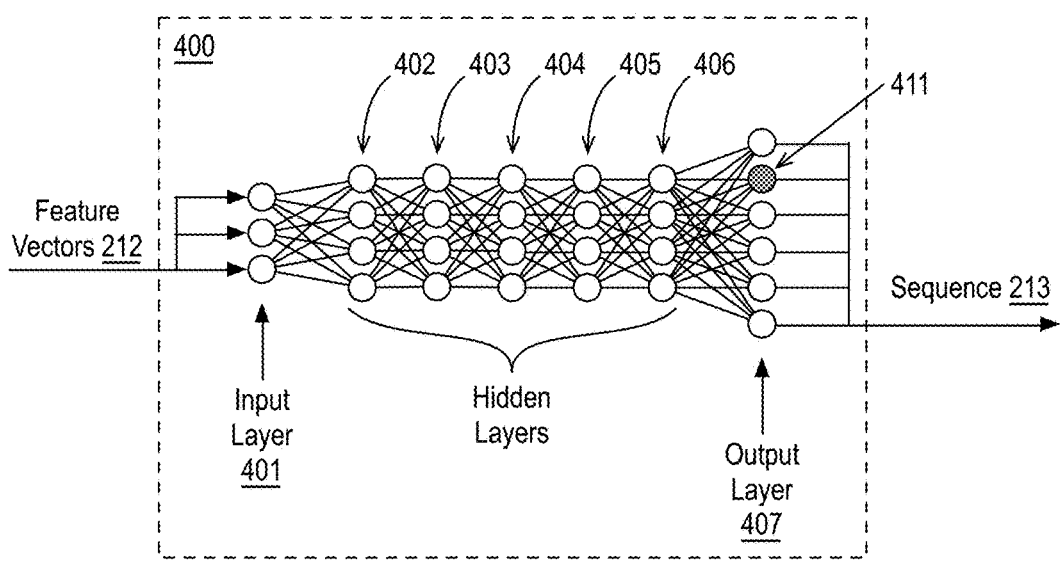
FIG. 4 illustrates an example acoustic model neural network.

FIG. 4 illustrates an example acoustic model neural network 400, arranged in accordance with at least some implementations of the present disclosure. For example, neural network 400 may be implemented as acoustic scoring module 203 in some embodiments. Neural network 400 may include any suitable neural network such as an artificial neural network, a deep neural network, a convolutional neural network, or the like. As shown in FIG. 4, neural network 400 may include an input layer 401, hidden layers 402-406, and an output layer 407. Neural network 400 is illustrated as having three input nodes, hidden layers with four nodes each, and six output nodes for the sake of clarity of presentation, however, neural network 400 may include any such input, hidden, and output nodes. Input layer 401 may include any suitable number of nodes such as a number of nodes equal to the number of elements in each of feature vectors 212. For example, input layer 401 may have 143 nodes corresponding to each of the 143 dimensions of feature vectors 212. In other examples, feature vectors may have fewer or more elements or dimensions and input layer 401 may have a corresponding number of nodes.

Furthermore, as in the illustrated example, neural network 400 may include five hidden layers 402-406. However, neural network 400 may include any number of hidden layers. Hidden layers 402-406 may include any number of nodes. For example, hidden layers 402-406 may include 1,500 to 2,000 nodes, 2,000 to 2,500 nodes, or the like. In some examples, hidden layers 402-406 have the same number of nodes and, in other examples, one or more layers may have different numbers of nodes. Output layer 407 may include any suitable number of nodes with nodes of output layer 407 corresponding to tied context-dependent triphone states (e.g., sub-phonetic units), silence states, noise states, or the like. For example, output layer 407 may include nodes corresponding to audio units such as sub-phonetic audio units, silence audio units, and/or noise audio units as discussed herein. In an embodiment, neural network 400 provides a probability (or probability score) for each of such audio units at output layer 407. Also, as shown in FIG. 4, a particular node 411 for a particular time instance may correspond to a highest probability (e.g., highest probability score). With reference to FIG. 3, for the particular time instance, the audio unit (or index thereto) corresponding to particular node 411 is provided in sequence of most probable audio units 213 for the particular time instance. For example, a controller (not shown) or the like may determine sequence of most probable audio units 213 based on the scoring provided by neural network 400 such that each audio unit of sequence of most probable audio units 213 corresponds to a highest score from neural network 400.

Returning to FIG. 2, as discussed, sequence of most probable audio units 213 from acoustic scoring module 203 are provided to post processor 204. Post processor 204 receives sequence of most probable audio units 213 and eliminates one or more audio units from sequence of most probable audio units 213 to generate final sequence of audio units 214. As discussed, in some examples, silence audio units may be left in sequence of most probable audio units 213 and/or added to sequence of most probable audio units 213.

Figure 5:
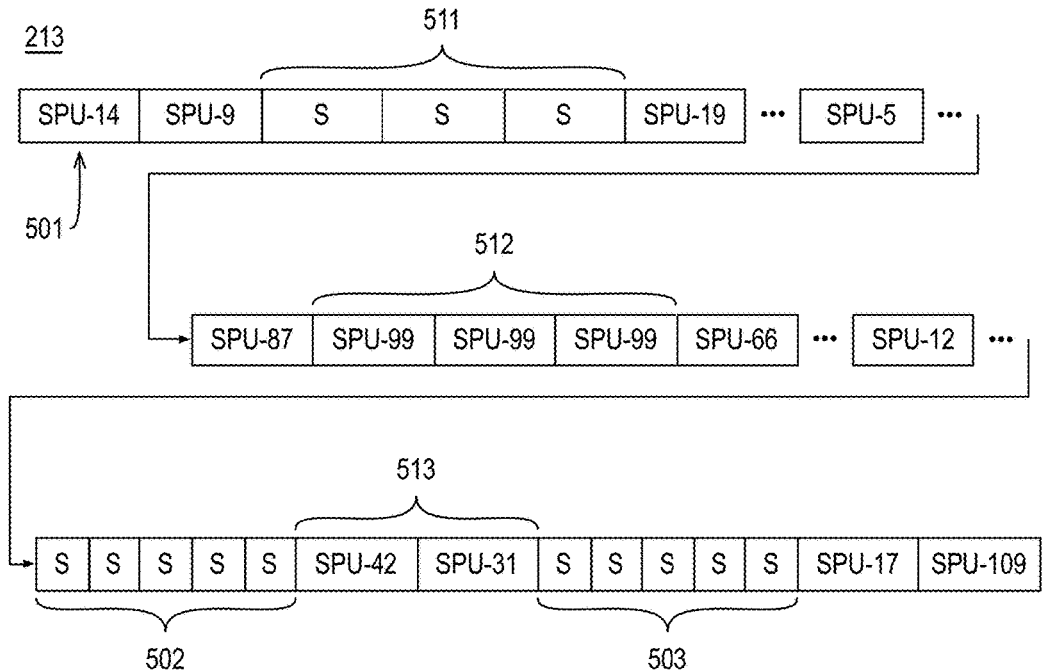
FIG. 5 illustrates an example sequence of most probable audio units.

FIG. 5 illustrates an example sequence of most probable audio units 213, arranged in accordance with at least some implementations of the present disclosure. As shown, sequence of most probable audio units 213 may include audio units 501 or indexes thereto such that each audio unit of sequence of most probable audio units 213 is identified. In the given example, sequence of most probable audio units 213 includes a sub-phonetic unit (SPU) 14 (e.g., index 14 referring to a particular predefined sub-phonetic unit of speech), a sub-phonetic unit 9, silence (S) units 511 (e.g., three silence audio units), a sub-phonetic unit 19, an unlabeled sequence of audio units, a sub-phonetic unit 5, an unlabeled sequence of audio units, a sub-phonetic unit 87, identical sub-phonetic units 512 (e.g., each is a sub-phonetic unit 99), a sub-phonetic unit 66, an unlabeled sequence of audio units, a sub-phonetic unit 12, an unlabeled sequence of audio units, a block of silence units 502, silence surrounded sub-phonetic units 513 (e.g., sub-phonetic units 42, 31), a block of silence units 503, a sub-phonetic unit 17, and a sub-phonetic unit 109. In FIG. 5, each silence unit of block of silence units 502, 503 are illustrated as smaller with respect to other audio units 501 only for the sake of clarity of presentation. Each silence unit of block of silence units 502, 503 is the same duration as other audio units 501 of sequence of most probable audio units 213. As will be appreciated, sequence of most probable audio units 213 is merely an example to illustrate aspects of the present embodiments and sequence of most probable audio units 213 may include any suitable audio units in any order.

Figure 6:
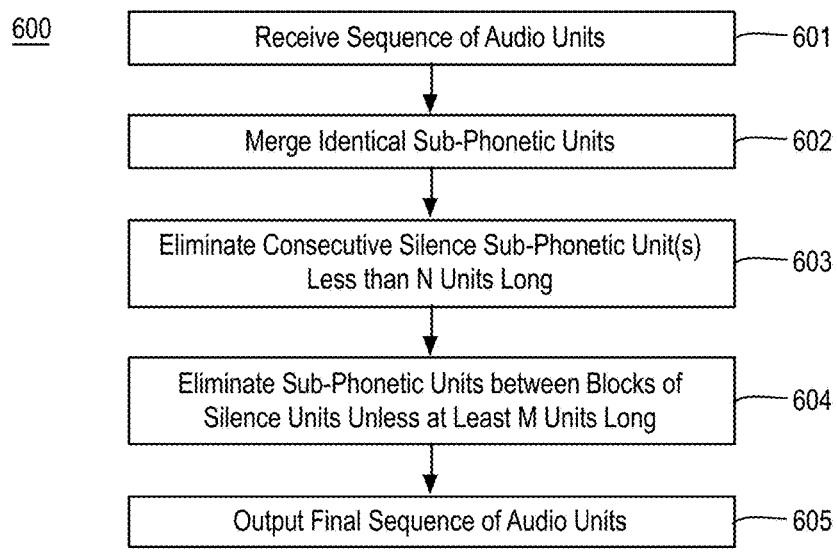
FIG. 6 illustrates an example process for post processing a sequence of most probable audio units to generate a final sequence audio units.

FIG. 6 illustrates an example process 600 for post processing a sequence of most probable audio units to generate a final sequence audio units, arranged in accordance with at least some implementations of the present disclosure. Process 600 may include one or more operations 601-605 as illustrated in FIG. 6. Process 600 or portions thereof may be performed by any device or system to post process a sequence of most probable audio units. Process 600 or portions thereof may be repeated for any number of sequences of most probable audio units or the like.

Process 600 may begin at operation 601, where a sequence of most probable audio units is received. For example, sequence of most probable audio units 213 may be received by post processor 204 for processing to remove or eliminate one or more audio units therefrom to generate a final sequence of audio units such as final sequence of audio units 214.

Processing may continue at operation 602, where identical consecutive sub-phonetic units of the sequence of most probable audio units may be merged. For example, the sequence of most probable audio units may be analyzed for two or more consecutive matching sub-phonetic units (e.g., sub-phonetic units including non-silence units that correspond to a unit of speech such as a senones) and only a single of the matching sub-phonetic units may be kept while the rest are discarded or eliminated. For example, operation 602 may process the sequence of most probable audio units to determine a first sub-phonetic audio unit of the sequence and a second sub-phonetic audio unit of the sequence immediately temporally following the first sub-phonetic audio unit match and to eliminate the first or second sub-phonetic audio unit from the sequence of most probable audio units. For example, if more than two identical or matching sub-phonetic audio units are detected, they may be merged to one sub-phonetic audio unit. As discussed, sub-phonetic audio units are those that model speech. For example, outputs from neural network 400 that are identical among consecutive frames may be merged to a single output.

Figure 7:
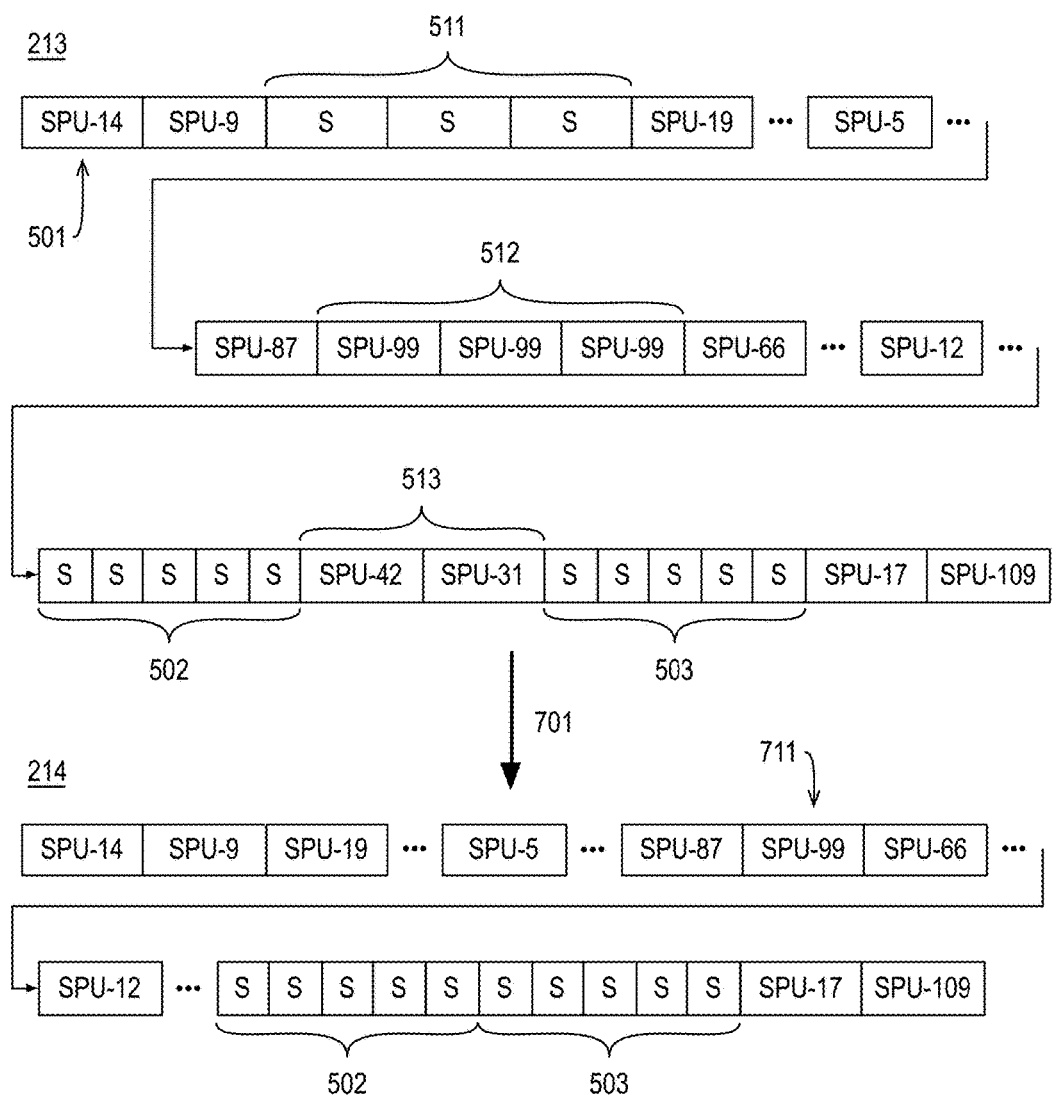
FIG. 7 illustrates example post processing operations performed on example sequence of most probable audio units to generate an example final sequence of audio units.

FIG. 7 illustrates example post processing operations 701 performed on example sequence of most probable audio units 213 to generate an example final sequence of audio units 214, arranged in accordance with at least some implementations of the present disclosure. As shown, post processing operations 701 may be performed on sequence of most probable audio units 213 to generate example final sequence of audio units 214. Also as shown, post processing operations 701 may provide final sequence of audio units 214 having a sub-phonetic unit 14, a sub-phonetic unit 9, a sub-phonetic unit 19, an unlabeled sequence of audio units, a sub-phonetic unit 5, an unlabeled sequence of audio units, a sub-phonetic unit 87, a sub-phonetic unit 99, a sub-phonetic unit 66, an unlabeled sequence of audio units, a sub-phonetic unit 12, an unlabeled sequence of audio units, block of silence units 502, block of silence units 503, a sub-phonetic unit 17, and a sub-phonetic unit 109.

With reference to FIG. 6 and as shown in FIG. 7, identical sub-phonetic units 512 are merged to a single sub-phonetic unit 711 (e.g., a sub-phonetic unit 99) based on operation 602. For example, since identical sub-phonetic units 512 match, all but one sub-phonetic unit 711 have been eliminated or discarded in the generation of final sequence of audio units 214.

Returning to FIG. 6, processing may continue at operation 603, where silence audio units that are isolated or in groups less than a threshold, N, units long (e.g., the number of consecutive silence audio units is less than a threshold) are eliminated or discarded. The threshold, N, may be any suitable value such as five (e.g., only groups of consecutive silence audio units having at least five units in a row are kept), four, six, or the like. For example, operation 603 may process the sequence of most probable audio units to determine a first silence audio unit of the sequence, to determine a number of silence audio units, if any, immediately temporally following the first silence audio unit, and to eliminate the first silence audio unit and the immediately temporally following silence audio units, if any, in response to the total number consecutive of silence audio units not exceeding a threshold such as five or the like. For example, outputs from neural network 400 that belong to silences are only considered when there are at least N consecutive silence outputs (e.g., N=5 such that the duration of silence is at least 50 ms). For example, if five or more consecutive silence audio units (of the same or different types) are observed in the sequence of most probable audio units, the silence audio units are kept (e.g., not discarded) in the final sequence of audio units. For example, silence audio units may be combined into a silence that is included in the final sequence of audio units 214.

Turning now to FIG. 7, as shown, three consecutive silence units 511 of sequence of most probable audio units 213 are eliminated or discarded therefrom to generate final sequence of audio units 214 based on operation 603. As discussed, as long as the number silence units 511 is less than (or does not exceed or the like) a predetermined threshold, they are eliminated or discarded. For example, a single silence unit would also be eliminated. As shown in FIG. 7, block of silence units 502, 503 are not eliminated or discarded as they each have at least the threshold (e.g., five in this example) number of consecutive silence units. Furthermore, although all silence audio units are labeled herein with an S, such silence audio units may also be indexed.

Returning to FIG. 6, processing may continue at operation 604, where sub-phonetic units that are between silence blocks of silence units are eliminated or discarded if they have less than a threshold or do not have at least a threshold, M, number of consecutive sub-phonetic units. The threshold, M, may be any suitable value such as three (e.g., only groups of sub-phonetic units that are between silence blocks of silence units having at least three sub-phonetic units in a row are kept). As used herein, the term silence block may refer to a number silence units that are kept (e.g., that meet the threshold N as discussed with respect to operation 603). For example, operation 604 may process the sequence of most probable audio units to determine a number of sub-phonetic audio units are temporally between a first block of silence audio units and a second block of silence audio units of the sequence and to eliminate the sub-phonetic audio units in response to the number sub-phonetic audio units temporally between the first and second blocks of silence audio units not exceeding a threshold. For example, non-silence outputs from neural network 400 in between blocks of silence outputs from neural network 400 are removed when their number is less than a threshold M (e.g., M=3). For example, if three or more consecutive non-silence audio units (e.g., sub-phonetic units) are observed between silence blocks, the non-silence audio units are kept (e.g., not discarded) in the final sequence of audio units.

Turning now to FIG. 7, as shown, two silence surrounded sub-phonetic units 513 (e.g., sub-phonetic units 42, 31) of sequence of most probable audio units 213 are eliminated or discarded therefrom to generate final sequence of audio units 214 based on operation 604 since the number (e.g., two) is less than the example threshold of three. As discussed, if the silence surrounded sub-phonetic units 513 was three or more, they would not be eliminated or discarded as they each have at least the threshold (e.g., three in this example) number of consecutive silence units.

Returning to FIG. 6, processing may continue at operation 605, where the final sequence of audio units is output. For example, final sequence of audio units 214 may be output from post processor 204 for further processing.

Returning now to FIG. 2, as discussed, key phrase recognition model builder 205 may receive final sequence of audio units 214 and key phrase recognition model builder 205 may generate key phrase recognition model 215 based on final sequence of audio units 214. Key phrase recognition model builder 205 may generate key phrase recognition model 215 using any suitable technique or techniques. For example, key phrase recognition model 215 may represent the user defined key phrase or phrases and key phrase recognition model 215 may include a single rejection state having a transition to a key phrase model as is discussed further herein with respect to FIGS. 9 and 10.

Figure 8:
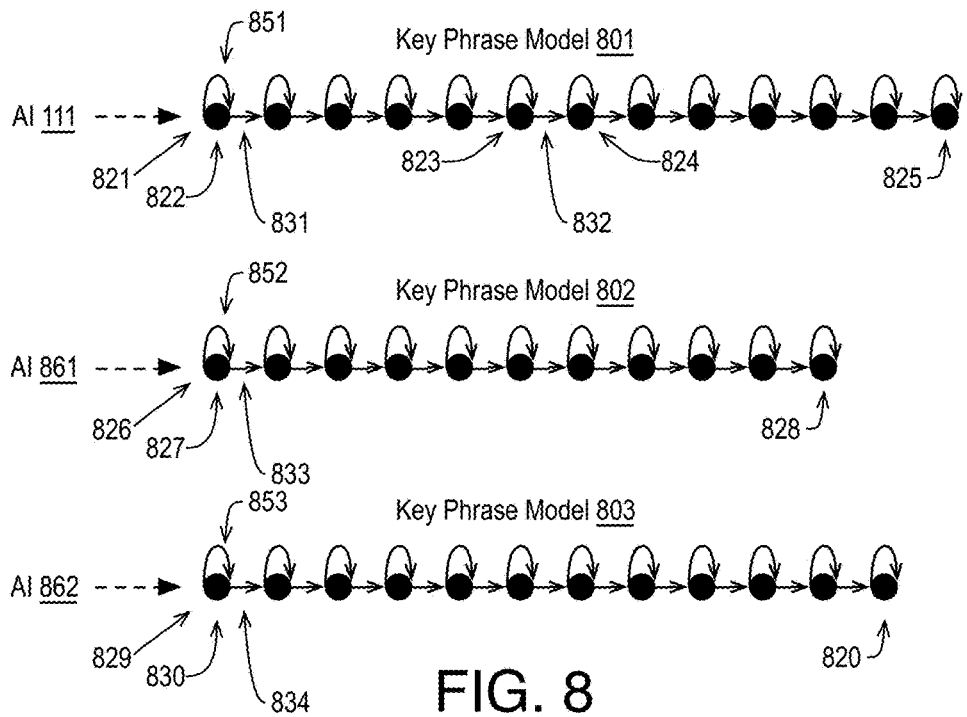
FIG. 8 illustrates example key phrase models.

FIG. 8 illustrates example key phrase models 801, 802, 803, arranged in accordance with at least some implementations of the present disclosure. As discussed, user 101 may generate any number of audio inputs (e.g., utterances) for the same user defined key phrase or for different user defined key phrases. Multiple audio inputs for the same user defined key phrase may provide robustness in key phrase detection. Multiple audio inputs for different user defined key phrases (e.g., one or more audio inputs for different user defined key phrases) may provide key phrases that provide different functionality (e.g., waking the device, having the device open an application or perform a task, or the like).

As shown in FIG. 8, audio inputs 111, 861, 862 may be used to generate key phrase models 801, 802, 803, respectively. For example, audio inputs 111, 861, 862 may be processed by microphone 201, features extraction module 202, acoustic scoring module 203, and post processor 204 to generate final sequences of audio units corresponding to the audio inputs. Each of key phrase models 801, 802, 803 may then be built or generated such that each state of the key phrase models 801, 802, 803 corresponds to an audio unit of the final sequences of audio unit corresponding to the audio input. Furthermore, the self loop of each state corresponds to the output of acoustic model 206 (e.g., neural network 400 or the like) that corresponds to the audio unit.

For example, as discussed, audio input 111 may be used to generate final sequence of audio units 214. In an embodiment, multiple states 821 such as states 823, 824, 825 (and other states not labeled for the sake of clarity) of key phrase model 801 may each correspond to an audio unit of final sequence of audio units 214. For example, in an implementation phase, states 821 of key phrase model 801 may be scored using corresponding self loops 851 such that states 821 correspond to audio units of final sequence of audio units 214. For example, each self loop 851 (or arc) and ingoing arc to a state 821 may be associated with or correspond to the output from acoustic scoring module 203 that provided the corresponding audio unit (e.g., if audio unit 91 corresponds to state 823, the self loop of state 823 and ingoing arc to state 823 will correspond to the audio unit 91 output probability provided by acoustic scoring module 203). Furthermore, states 821 of key phrase model 801 are interconnected by transitions 831, which transition scores between states 821 as is discussed further herein. Such transitions are provided in the order determined by final sequence of audio units 214. Furthermore, a state corresponding to silence may have more than one self-loop with the additional self-loops associated with silence outputs of acoustic scoring module 203 (e.g., outputs of the DNN).

Furthermore, audio input 861 may be used to generate a final sequence of audio units as discussed above. Each state of multiple states 826 such as states 827, 828 (and other states not labeled for the sake of clarity) of key phrase model 802 each correspond to an audio unit of the final sequence of audio units for audio input 861. In an implementation phase, states 826 of key phrase model 802 may be scored using corresponding self loops 852 such that states 826 correspond to audio units of the final sequence of audio units. As discussed, each self loop 852 may be associated with or correspond to the output from acoustic scoring module 203 that provided the corresponding audio unit of the final sequence of audio units used to build key phrase model 802. Furthermore, states 826 of key phrase model 802 are interconnected by transitions 832, which transition scores between states 826 in the order provided by the final sequence of audio units. Similarly, audio input 862 may be used to generate a final sequence of audio units. Multiple states 829 such as states 830, 820 (and other unlabeled states) of key phrase model 803 may each correspond to an audio unit of the final sequence of audio units for audio input 861. As discussed, states 829 of key phrase model 803 may be scored during implementation using corresponding self loops 853 such that states 829 correspond to audio units of the final sequence of audio units. As discussed, each self loop 853 may be associated with or correspond to the output from acoustic scoring module 203 that provided the corresponding audio unit of the final sequence of audio units used to build key phrase model 803. Also as shown, states 829 of key phrase model 803 are interconnected by transitions 834, which transition scores between states 829.

As discussed, user 101 may generate any number of audio inputs (e.g., utterances) for the same user defined key phrase or for different user defined key phrases such that multiple key phrase 801, 802, 803 may be generated. The multiple audio inputs for the same user defined key phrase or different user defined key phrases.

Furthermore, with reference to FIG. 2, key phrase recognition model builder 205 may generate key phrase recognition model 215 using one or more of key phrase models 801, 802, 803 or the like (e.g., by first generating one or more of key phrase models 801, 802, 803 or the like). For example, key phrase recognition model 215 includes a single rejection state having a transition to one or more such key phrase models. As discussed, the key phrase model or models each include a number of states having transitions therebetween such that the states of the key phrase model correspond to the final sequence of audio units on which the key phrase model is based.

Figure 9:
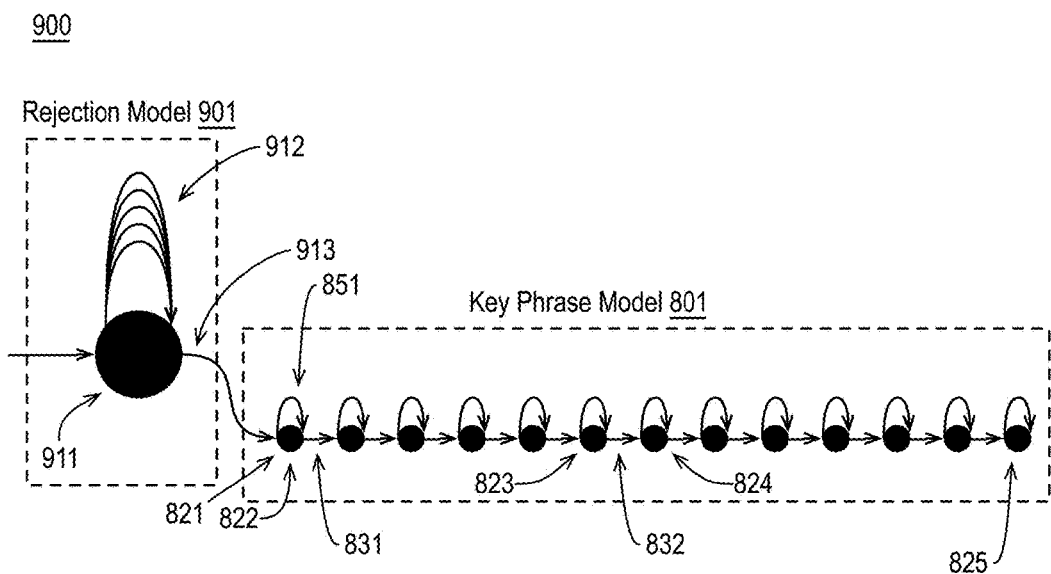
FIG. 9 illustrates an example key phrase recognition model having a single state rejection model and a key phrase model.

FIG. 9 illustrates an example key phrase recognition model 900 having a single state rejection model 901 and example key phrase model 801, arranged in accordance with at least some implementations of the present disclosure. For example, key phrase recognition model 900 may be provided to perform key phrase detection. Key phrase model 900 may implement a user defined or dependent key phrase recognition model enrolled as discussed herein or user independent key phrase recognition model that was acoustically pretrained. As shown in FIG. 9, rejection model 901 includes single rejection state 911 and multiple self loops 912. For example, rejection state 911 may correspond to a start state or a single state and may provide a single start state based rejection model. Furthermore, each of self loops 912 may be associated with one of multiple scores (e.g., an output from acoustic scoring module 203 during implementation as is discussed further herein) such that self loops 912 provide scoring or summing or the like for rejection state 911 of rejection model 901. For example, each of self loops 912 may be associated with a deep neural network output or output node that corresponds to an audio unit such as a sub-phonetic unit.

During implementation, for example, rejection state 911 provides a start state that implements a rejection model. Self loops 912 may include any number of self loops. In an embodiment, self loops 912 may include thousands of self loops. For example, during implementation, at each time instance of outputs from acoustic scoring module 203, rejection model 901 may be scored to provide a rejection likelihood score associated therewith. For example, self loops 912 may illustrate updated scoring to rejection state 911 at each time instance of outputs from acoustic scoring module 203 during implementation. In an embodiment, at each time instance, rejection state 911 may be scored (e.g., scores may be updated) with a highest likelihood score among self loops 912.

Also as shown in FIG. 9, key phrase model 801 may be subsequent to rejection model 901 and connected by transition 913 (which has the same DNN output as self loop 851). As discussed, key phrase model 801 may include multiple states 821 interconnected by transitions 831 such as transition 532 and other transitions as shown. Each of states 821 may include or be scored by a corresponding one or more self loops 851 and each of states 821 may be scored based on a transition of transitions 831 or transition 813 from a prior state in key phrase model 801. For example, each self loop 851 (or arc) may be associated with or correspond to an output (e.g., a score of multiple probability scores) from acoustic scoring module 203. In the illustrated example, each of states 821 has a single self loop 851. However, one or more of states 821 may include multiple self loops. In some examples, one or more of states 821 may be silence states having self loops representative of silence.

As shown in FIG. 9, in some embodiments, key phrase recognition model 901 includes a single rejection state 911 rejection model 901 and a single key phrase model 801. In other embodiments, a key phrase recognition model includes a single rejection state 911 rejection model 901 and multiple key phrase models.

Figure 10:
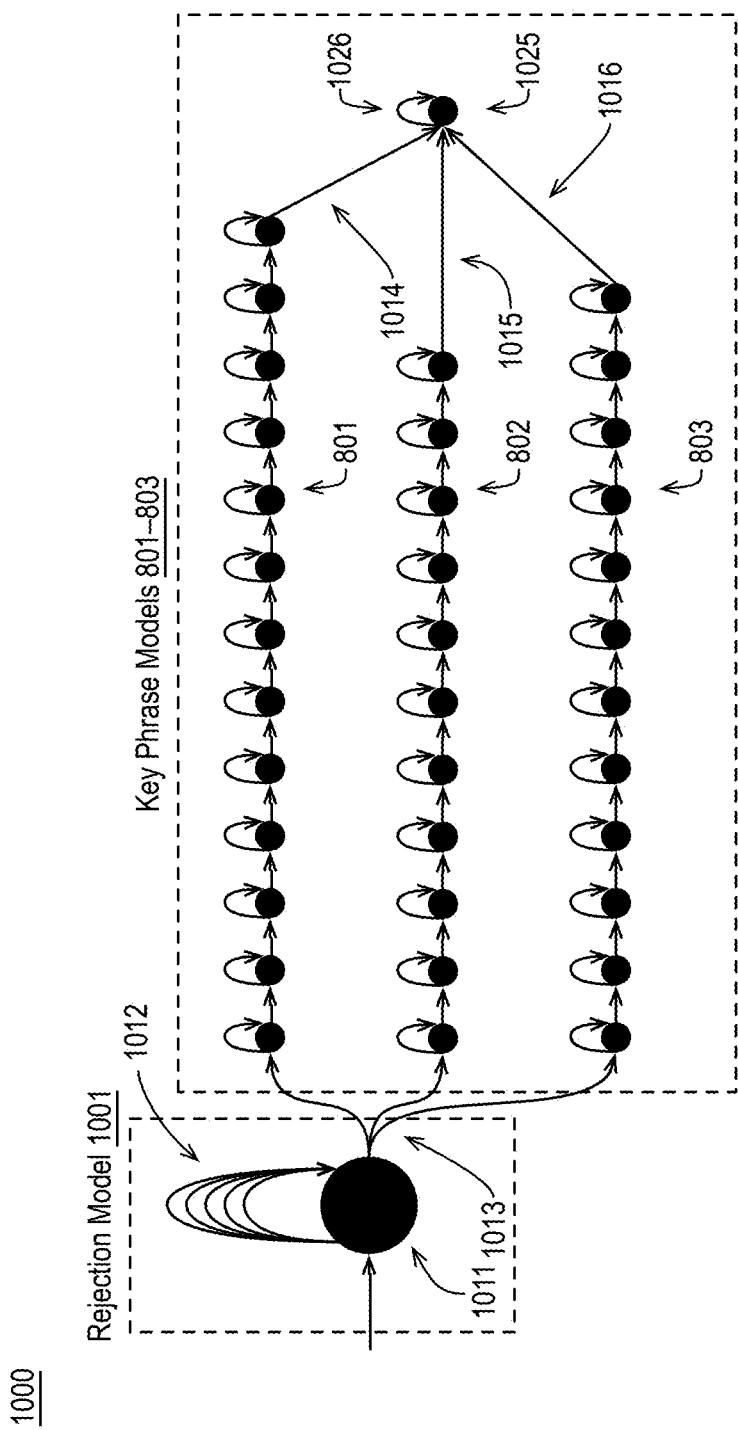
FIG. 10 illustrates an example key phrase recognition model having a single state rejection model and multiple example key phrase models.

FIG. 10 illustrates an example key phrase recognition model 1000 having a single state rejection model 1001 and multiple example key phrase models 801, 802, 803, arranged in accordance with at least some implementations of the present disclosure. As shown, in an embodiment, key phrase models 801, 802, 803 may share a common final state 1025. As discussed further herein, in some examples, key phrase models 801, 802, 803 may not share a common final state. Such implementations may have the advantage of separately detecting phrases with the added complexity of tracking multiple scores. For example, key phrase recognition model 1000 may be provided for implementation to perform key phrase detection such that each of key phrase models 801, 802, 803 may correspond to the same user defined key phrase uttered multiple times by user 101. Although key phrase recognition model 1000 includes three key phrase models 801, 802, 803, any number may be provided such as two key phrase models, four key phrase models, or the like.

Furthermore, in other embodiments, key phrase models 801, 802, 803 do not share a common final state 1025 and, instead, each of key phrase models 801, 802, 803 has its own final state as illustrated with respect to FIG. 8. In such embodiments, again, any number of key phrase models 801, 802, 803 such as two or four or more may be provided. Such embodiments may be advantageous when multiple different key phrases are being implemented. Also, as is discussed further herein, during an implementation phase, multiple key phrase recognition models such as key phrase recognition model 900 and/or key phrase recognition model 1000 and/or multiples thereof may be implemented to evaluate any number of user defined key phrases that match or not and, even, user independent (e.g., predefined key phrases) based on multiple builds of various key phrase recognition models.

As discussed, rejection model 1001 of key phrase recognition model 1000 includes single rejection state 1011 and multiple self loops 1012 such that rejection state 1011 corresponds to a start state or a single state and may provide a single start state based rejection model. Furthermore, each of self loops 1012 may be associated with one of multiple scores (e.g., an output from acoustic scoring module 203 during implementation) such that self loops 1012 provide self scoring or summing or the like for rejection state 1011 of rejection model 1001. For example, each of self loops 1012 may be associated with a deep neural network output or output node that corresponds to an audio unit such as a sub-phonetic unit. Also as shown, key phrase models 801, 802, 803 may be subsequent to rejection model 1001 and connected by transitions 1013 (e.g., with one transition to each of key phrase models 801, 802, 803). As discussed, key phrase models 801, 802, 803 may each include multiple states interconnected by transitions and each state may be scored by one or more self loops and transitions thereto. Such self loops and transitions are not labeled in FIG. 10 for the sake of clarity of presentation. As discussed, each self loop corresponds to an output (e.g., a score of multiple probability scores) from acoustic scoring module 203 during implementation. Furthermore, a final state 1025 may be shared by key phrase models 801, 802, 803 such that a pre-final state of each of key phrase models 801, 802, 803 transitions via transitions 1014, 1015, 1016, respectively to final state 1025.

For example, one or more key phrase recognition models may be built by key phrase recognition model builder 205 of system 200 during an enrollment or build phase. Each key phrase recognition model may include a single rejection state having one or more transitions to one or more key phrase models, respectively. Each key phrase model includes a sequence of states interconnected by transitions such that the sequence of states includes a final state, which may be independent to the key phrase model or shared among multiple key phrase models of the key phrase recognition model. During implementation, such one or more key phrase recognition models (e.g., the states thereof) are scored (e.g., scores are updated) at each time instance based on scoring received from an acoustic scoring model such that likelihoods of the states (and transitions thereto) are summed over time. Furthermore, after enough acoustic activity has occurred such that the final state has a meaningful score, the score at the final state (e.g., a key phrase likelihood score) and the score at the rejection state (e.g., a rejection likelihood score) are evaluated to determine whether the key phrase corresponding to the key phrase model of the key phrase recognition model has been uttered (e.g., corresponding to a comparatively high key phrase likelihood score) or not (e.g., corresponding to a comparatively high rejection likelihood score). Such processing continues over time until a key phrase has been recognized and the device takes a suitable action (e.g., wakes, executes a command, etc.) or as no key phrase has been recognized (e.g., until the system determines there is no longer audio activity and stops such processing).

Figure 11:
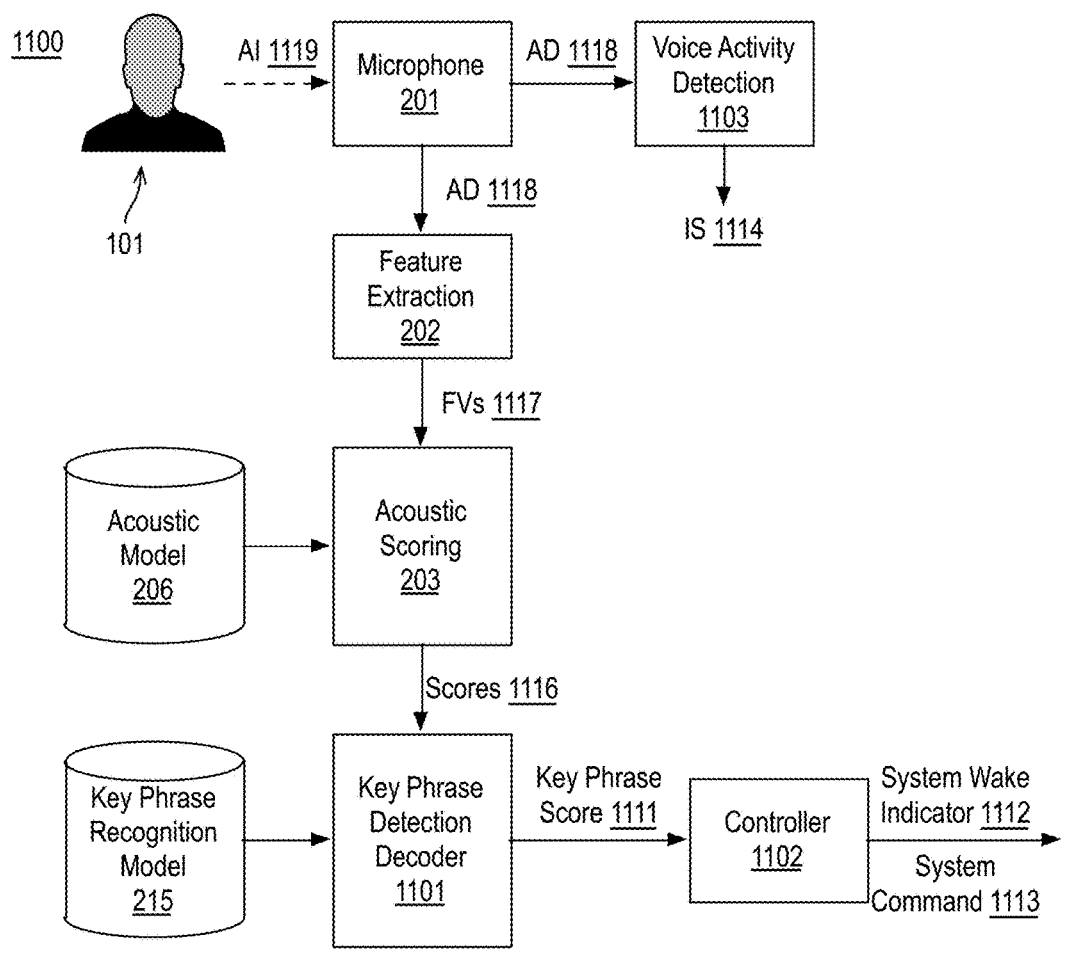
FIG. 11 is an illustrative diagram of an example system for providing key phrase detection based on a user defined key phrase.

FIG. 11 is an illustrative diagram of an example system 1100 for providing key phrase detection based on a user defined key phrase, arranged in accordance with at least some implementations of the present disclosure. For example, system 1100 may be implemented by device 102 to provide key phrase detection. As shown in FIG. 11, system 1100 may include microphone 201, feature extraction module 202, acoustic scoring module 203, a key phrase detection decoder 1101, key phrase and rejection models 215, a controller 1102, acoustic model 206, and a voice activity detection module 1103. As shown system 1100 may include common components with respect to system 200. In some embodiments, system 200 and system 1100 are implemented by the same device with common component redundancy eliminated. In an embodiment, system 200 provides key phrase recognition model enrollment and construction as discussed herein and system 1100 may receive a key phrase recognition model and provide key phrase recognition. In an embodiment, system 1100 may receive key phrase recognition model 215 from another device for implementation. For example, system 200 and system 1100 may be implemented by different devices.

In an embodiment, acoustic model 206 may be pruned prior to implementation via system 1100. For example, a pruned acoustic model 206 may be generated prior to implementation (by system 200 or system 1100) based on the subset(s) of output nodes needed for implementation of key phrase recognition model 215. For example, pruned acoustic model 206 may include outputs associated with the subset of output nodes used by key phrase recognition model 215 (or models). For example, the output nodes corresponding to self loop scoring and/or transition scoring may be implemented while other output nodes may be discarded. Such pruning may provide for a low resource acoustic model during implementation by system 1100. For example, system 200 or system 1100 may determine subsets of output nodes of acoustic model 206 that are not used during implementation and such subsets of output nodes may be discarded or removed from the full acoustic model to generate a pruned acoustic model. For example, the number of outputs may reduced from about 4,000 outputs to about 100 outputs using such pruning techniques.

As shown in FIG. 11, key phrase detection decoder 1101 may provide a key phrase score 1111 to controller 1102. Based on key phrase score 1111 (e.g., if key phrase score 1111 is greater than a threshold or the like), controller 1102 may provide a system wake indicator 1112 (e.g., if key phrase score 1111 indicates a predetermined key phrase has been matched) or controller 1102 may not provide such an indicator and system 1100 may continue evaluating input speech for a match. As shown, in some examples, controller 1102 may, in addition or in the alternative, provide a system command 1113 associated with the key phrase to request system 1100 to perform an operation such as starting an application, generating or retrieving data, or the like. In some embodiments, feature extraction module 202, acoustic scoring module 203, key phrase detection decoder 1101, controller 1102, and voice activity detection module 1103 may be implemented via a digital signal processor (DSP).

As discussed, in some embodiments, system 1100 may implement a single user dependent key phrase such that, upon detection of the key phrase, system wake indicator 1112 and/or system command 1113 may be provided. In other embodiments, system 1100 may implement multiple user dependent key phrases or a combination of user dependent and user independent key phrases (based on implementing multiple key phrase models) using the same key phrase recognition model or multiple key phrase recognition models. In such embodiments, if any of the key phrases are detected, system wake indicator 1112 and/or system command 1113 may be provided.

As discussed with respect to system 1100, microphone 201 may receive an audio input (AI) 1119 from user 101 (or multiple users or an environment or the like). In some examples, audio input 1119 is issued by user 101 to wake system 1100 and/or to have system 1100 perform an operation. Audio input 1119 may include any speech issued by user 101 and any other background noise. Microphone 201 may receive audio input 1119 and convert audio input 1119 to an electrical signal such as a digital signal to generate audio data (AD) 1118. As shown, voice activity detection module 1103 may receive audio data 1118. For example, voice activity detection module 207 may operate (e.g., via a DSP) even in a deep sleep mode of system 1100 to continuously monitor audio data 1118. Upon detection of a voice or other sound that requires further evaluation by system 1100, voice activity detection module 1103 may provide initiation signal (IS) 1114, which may activate the other modules of system 1100 to provide user defined key phrase detection. In an embodiment, a portion of audio data 1118 (e.g., 360 ms of audio data or the like) may be buffered by a ring-buffer or the like and, when a voice or other sound that requires further evaluation is detected by voice activity detection module 1103, feature extraction module 202 may receive the data from the buffer and further incoming audio via audio data 1118.

If a predetermined use defined key phrase is detected, as discussed herein, system 1100 may enter a higher level mode of operation and voice activity detection module 1103 may operate during key phrase detection (e.g., while a key phrase is not yet detected) to determine whether system 1100 may be put back into a deep sleep mode. For example, voice activity detection module 1103 may provide a low power always listening capability for system 1100. For example, upon activation by initiation signal 1114, audio data 1118 may be continuously monitored for key phrase detection until controller 1102 determines a key phrase has been detected and system wake indicator 1112 is provided or until a determination is made by voice activity detection module 1103 to reenter a sleep mode or low power state or the like.

As discussed with respect to system 1100, feature extraction module 202 may receive audio data 1118 and feature extraction module 202 may generate feature vectors 1117 as discussed herein. Feature vectors 1117 may be any suitable features or feature vectors or the like representing audio input 1119 such as those discussed herein with respect to FIG. 3 and elsewhere herein. For example, feature vectors 1117 may be a time series of feature vectors (e.g., feature vectors each generated for an instance of time) such that each of feature vectors 1117 includes a stack of features or feature vectors each from an instance of time such as a sampling time, corresponding to a time frame, or the like.

As shown in FIG. 11, feature vectors 1117 may be provided to acoustic scoring module 203. Acoustic scoring module 203 may score feature vectors 1117 based on acoustic model 206 as received via memory and provide output scores 1116 based on feature vectors 1117. Output scores 1116 may be characterized as scores, probabilities, scores of audio units, or the like. For example, acoustic scoring module 203 may generate such output scores for each of feature vectors 1117 (e.g., for each time instance) to generate a time series of scores 1116. For example, scores 1116 may be a time series of scores of audio units such as sub-phonetic units, silence units, noise units, or the like. In an embodiment, acoustic scoring module 203 receives and implements acoustic model 206 as discussed herein. In an embodiment, acoustic model 206 may be a deep neural network (DNN) pretrained based on a training set of audio. In an embodiment, acoustic model 206 is neural network 400.

For example, the outputs of acoustic scoring module 203 (e.g., scores 1116) may represent audio units including sub-phonetic units such as tied context-dependent triphone states as discussed herein. For example, for each time instance and feature vector corresponding thereto, scores 1116 may include a probability score for each output (e.g., each output node) of the acoustic model 206 implemented by acoustic scoring module 203. With reference to FIG. 4, in the context of a neural network implementation scores 1116 at a particular time instance may include a score for each node of output layer 407. Therefore, acoustic scoring module 203 may have the capability of providing all such scores and/or the capability of providing the output (e.g., output node) or index thereof corresponding to the node having the highest probability score. As discussed above, in the context of building a key phrase model, such a highest probability score may identify the most likely spoken audio unit and such highest probability audio units may be post processed and used to build a key phrase model as discussed herein. In the context of implementing a user defined key phrase recognition model, such probability scores (e.g., the portion thereof as used by the model) may be used to score the key phrase recognition model as discussed further herein below.

Scores 1116 from acoustic scoring module 203 are provided to key phrase detection decoder 1101. Also, as shown, key phrase detection decoder 1101 receives and implements key phrase recognition model 215 (or multiple key phrase recognition models) such as key phrase recognition model 900, key phrase recognition model 1000, or any key phrase recognition model discussed herein. For example, key phrase detection decoder 1101 may receive a key phrase recognition model including a rejection model and one or more key phrase models from memory.

With reference to FIG. 9, based on rejection model 901 and key phrase model 801, at each or some time instances, a rejection likelihood score and a key phrase likelihood score may be determined by key phrase detection decoder 1101. For example, the rejection likelihood score may be a score associated with rejection state 911 of rejection model 901 and the key phrase likelihood score may be associated with final state 825 of states 821 of key phrase model 801. For example, rejection model 901 and key phrase model 801 may be initialized with all states thereof at null or negative infinity or the like. Based on a first feature vector (e.g., $FV_1$), acoustic scoring module 203 may generate scores (e.g., $S_1$), and rejection state 911 of rejection model 901 and a first state (e.g., state 822) of key phrase model 801 are scored. Upon a second feature vector (e.g., $FV_2$) being processed, acoustic scoring module 203 may generate scores (e.g., $S_2$), and rejection state 911 of rejection model 901 and a first and second state of key phrase model 801 may be scored (e.g., scores may be updated). Such processing may continue until final state 825 is updated from its initialization state to a meaningful score. At such a time instance (and subsequent time instances as scoring continue), the score or probability or the like of rejection state 911 and the score or probability or the like of final state 825 may be used to determine whether the user defined key phrase has been detected. For example, a time series of key phrase scores 1111 may be generated by key phrase detection decoder 1101 based on scores 1116, and key phrase recognition model 900.

For example, at a current time instance, the scoring of single state 911 or any of states 821 may proceed as follows. For the state, a number of scores at the current time instance (e.g., t+1) may be determined and the maximum score may be used as the score for the state at the current time instance. The scores for the state may include a score from a previous time instance for the state plus a highest probability score or maximum score or the like of all ingoing transitions, including the self loops, corresponding with the state. Also, the scores for the state may include a score for a state transitioning to the state at the previous time instance plus a highest probability score or maximum score or the like of all ingoing transitions, including the self loops, corresponding with the state. In some examples, the ingoing transition or transitions of the state and the self loops of the state are associated with the same acoustic scoring module 203 outputs (e.g., DNN outputs). The highest probability score for the current time instance for the state may then be added to the maximum of the score for the state at the previous time instance (e.g., t) and any score transitioned to the state for the previous time instance. As shown, in some embodiments, transitions are from preceding states. However, transitions may be from any state of the model. For example, the score or scores transitioned to a state may correspond to the previous time instance (e.g., t). For example, with reference to state 822, the score of state 822 at a current time instance (e.g., t+1) may be the maximum of (a) a score at state 911 at the previous time instance (e.g., t) plus a maximum score of transition 913 (which has the same DNN output as self loops 851) and (b) a score of state 822 at the current time instance (e.g., t+1) plus a maximum of score of self loops 851. Similarly, the score of rejection state 911 at a current time instance (e.g., t+1) may be the maximum value of self loops 912 at the current time instance (e.g., as provided by acoustic scoring module 203) added to the score of rejection state 911 at a previous time instance (e.g., t). Transitions may also be provided to rejection state 911 in analogy to those provided to states 821.

Such scoring of rejection model 901 and key phrase model 801 may be performed at each available time instance. Furthermore, the discussed key phrase likelihood scoring (e.g., corresponding to final state 825) and rejection likelihood scoring (e.g., corresponding to single state 911) may be performed at each available time instance until a key phrase is detected or processing is stopped.

Similarly, with reference to FIG. 10, based on rejection model 1001 and key phrase models 801, 802, 803 at each or some time instances, a rejection likelihood score and a key phrase likelihood score may be determined by key phrase detection decoder 1101. For example, the rejection likelihood score may be a score associated with rejection state 1011 of rejection model 1001 and the key phrase likelihood score may be associated with shared final state 1025 of key phrase models 801, 802, 803. Rejection model 1001 and key phrase models 801, 802, 803 are updated in analogy to the discussion provided with respect to FIG. 9 and such details will not be repeated for the sake of brevity. As shown in FIG. 10, shared final state 1025 may include transitions from pre-final states of key phrase models 801, 802, 803 and shared final state 1025 may include one or more self loops 1026. The scoring of final state 1025 includes, determining a highest probability score or maximum score or the like of self loops 1026 (or only score if a single self loop is provided) for the current time instance (e.g., t+1). The highest probability score (or only score) for the current time instance for final state 1025 is then be added to the maximum of the score for final state 1025 at the previous time instance (e.g., t), the score transitioned to final state 1025 by transition 1014, the score transitioned to final state 1025 by transition 1015, and the score transitioned to final state 1025 by transition 1016.

With reference to FIG. 11, key phrase scores 1111 may include any suitable key phrase scores that compare the likelihood generated at a rejection state with the likelihood generated at a state of a key phrase model such as final state 825, shared final state 1025, or the like. For example, key phrase scores 1111 may be difference between such states, a ratio of such states, or the states themselves. In an embodiment, a key phrase score of key phrase scores 1111 may be a log likelihood ratio. For example, a key phrase score of key phrase scores 1111 may be determined as shown in Equation (1):

$$KPS = \log(p(X|\text{KeyPhrase})) - \log(p(X|\text{Reject})) \tag{1}$$

where KPS may be the key phrase score, X may be the current accumulation of feature vectors being evaluated, and p provides a probability X is a member of KeyPhrase or Reject.

As shown in FIG. 11, controller 1102 receives key phrase scores 1111 (e.g., a time series of key phrase scores) and controller 1102 compares key phrase score 1111 to a threshold or the like to determine whether a user defined key phrase or any user defined key phrase has been detected. For example, if key phrase score 1111 is greater than (or greater than or equal to) the threshold, the predetermined key phrase has been detected and controller 1111 may provide system wake indicator 1112 to wake system 1100. If key phrase score 1111 is less than (or less than or equal to) the threshold, the predetermined key phrase has not been detected and controller 1102 may not provide system wake indicator 1112 and controller 1102 may continue to monitor key phrase scores 1111.

As discussed, in some embodiments, a single key phrase recognition model may be implemented and, in other embodiments, multiple key phrase recognition models may be implemented. Furthermore, a single key phrase recognition model may have multiple key phrase models sharing a final state or multiple key phrase models each having an independent final state. In such contexts, key phrase scores 1111 may include, for each time instance, multiple scores for such multiple key phrase recognition models and/or multiple scores for such independent final states of key phrase models of the key phrase recognition model. For example, controller 1102 may evaluate each of such multiple key phrase scores at each time instance to determine which, if any, indicate a key phrase has been uttered by user 101. If any key phrase has been uttered, controller 1102 may determine a corresponding action or action to take based on the key phrase. For example, if the recognized key phrase corresponds to only a system wake phrase ("system wake"), controller 1102 asserts system wake indicator 1112 only. If the recognized key phrase corresponds to a system wake phrase and a command ("wake and check email", controller 1102 asserts system wake indicator 1112 and system command 1113 such that system command 1113 corresponds to the uttered command. Such flexibility may provide for a range of user defined capabilities for system 1100. For example, during enrollment, user 101 may select a command and provide an utterance that will evoke the command. As discussed, a key phrase recognition model is generated corresponding to the utterance (or multiple utterances if used), stored, and implemented by system 1100.

Figure 12:
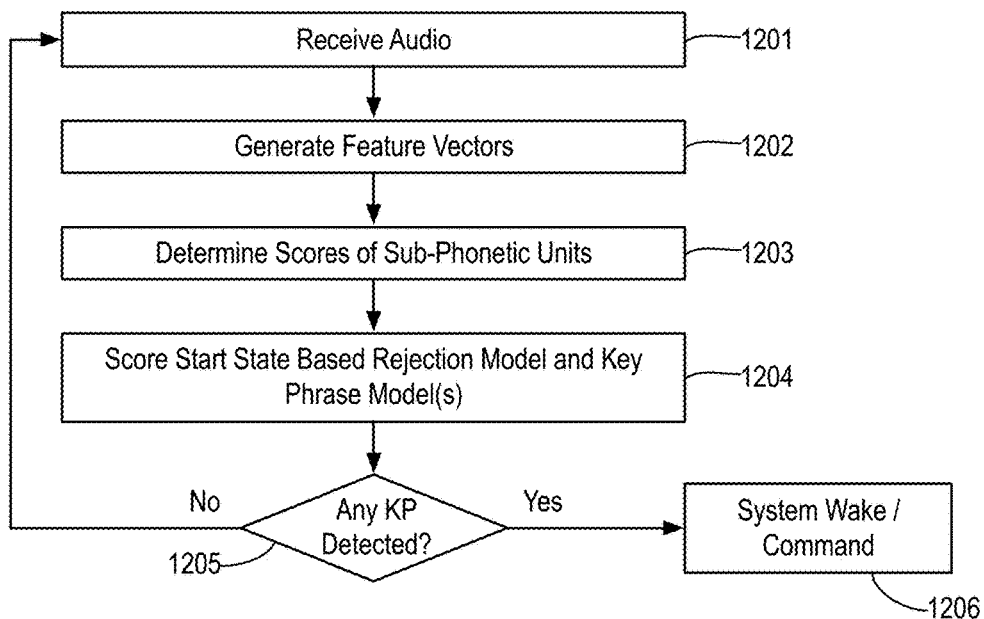
FIG. 12 illustrates an example process for key phrase detection based on a user dependent key phrase.

FIG. 12 illustrates an example process 1200 for key phrase detection based on a user dependent key phrase, arranged in accordance with at least some implementations of the present disclosure. Process 1200 may include one or more operations 1201-1206 as illustrated in FIG. 12. Process 1200 or portions thereof may be performed by a device or system (e.g., system 200 or any other device or system discussed herein) to detect a user defined key phrase. Process 1200 or portions thereof may be repeated for any amount of received audio, for any number of sleep to wake transitions, or the like.

Process 1200 may begin at operation 1201, where audio input may be received. Audio input may be received using any suitable technique or techniques. In an embodiment, audio input 1119 is received via microphone 201 of system 200 as discussed herein. Processing may continue at operation 1202, where feature vectors may be generated using any suitable technique or techniques. In an embodiment, feature vectors 1117 may be generated via feature extraction module 202 of system 1100 based on audio data 1118 as discussed herein. Processing may continue at operation 1203, where scores of audio units (e.g., audio units including sub-phonetic units, silence units, and/or noise units) may be determined using any suitable technique or techniques. For example, acoustic scoring module 203 may implement acoustic model 206 such as a deep neural network or the like to determine scores 1116 based on feature vectors 1117.

Processing may continue at operation 1204, where one or more key phrase recognition models are scored based on the scores of audio units. For example, each of the key phrase recognition models may include a single start state rejection model transitioning to one or more key phrase models generated as discussed herein. If multiple key phrase models are used, the multiple key phrase models may share a final state or each may have an independent final state. For example, for each of the key phrase recognition models, a single state of the rejection model may be scored (e.g., scoring may be updated) at each time instance of scores of audio units or at regular intervals of scores of audio units or the like. Similarly, multiple states of the key phrase model(s) may each be scored (e.g., scoring may be updated) at each time instance of scores of audio units or at regular intervals of scores of audio units or the like. As discussed, the single state of the rejection model may be scored based on the highest probability score associated with one of multiple self loops of the single state and the previous score at the single state of the rejection model and each state of the key phrase model(s) may be scored based on a self loop (or a maximum of multiple self loops) associated with the state and a maximum of the previous score at the state and a maximum transition from a previous state in the key phrase model. For example, the maximum self loop may be added to the maximum of the previous score at the state and a maximum transition of a previous state to update the score of the state. In an embodiment, key phrase detection decoder 1101 of system 1100 may implement rejection model 901 or 1001 and key phrase model 801 or one of key phrase models 801, 802, 803 or the like.

Processing may continue at decision operation 1205, where a determination may be made as to whether any key phrase (KP) has been detected. Such a determination may be made using any suitable technique or techniques. In an embodiment, the determination may be based on a rejection likelihood score from the rejection model updated at operation 1204 and one or more key phrase likelihood scores from the one or more key phrase models updated at operation 1204. In an embodiment, one or more log likelihood scores may be determined based on the rejection likelihood scores and the key phrase likelihood scores (e.g., as discussed with respect to Equation (1)) and the log likelihood score may be compared to a predetermined threshold. For example, if any log likelihood score exceeds (or meets) the threshold, decision operation 1205 may determine a key phrase corresponding to the log likelihood score exceeding (or meeting) the threshold has been detected. In an embodiment, controller 1102 as implemented by system 200 may determine whether a key phrase has been detected using such techniques.

If a key phrase has been detected, processing may continue at operation 1206, where a system wake and/or a system command may be provided based on the detected key phrase. The system wake and/or system command may include any suitable command(s) and may be implemented using any suitable technique or techniques. In an embodiment, controller 1102 of system 1100 may issue system wake indicator 1112 and/or system command 1113 in response to the key phrase being detected.

If a key phrase has not been detected, processing may continue at operation 1201, where additional audio may be received and processing may continue as discussed. For example, process 1200 may continue until a key phrase is detected. Although process 1200 is illustrated as discrete operations for clarity of presentation, at least portions of processing may be performed in parallel in some examples. Furthermore, in some examples, process 1200 may be initiated in response to an initiation signal such as initiation signal 1114, which may indicate an audio input worthy of evaluation has been received. Furthermore, in some examples, process 1200 may cease in response to a signal from voice activity detection module 1103.

Figure 13:
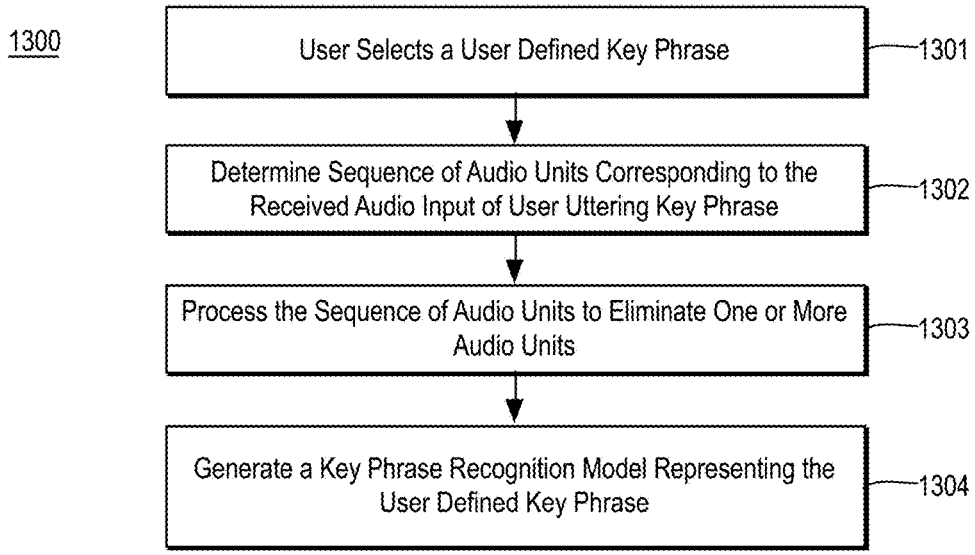
FIG. 13 is a flow diagram illustrating an example process for key phrase enrollment and/or detection.

FIG. 13 is a flow diagram illustrating an example process 1300 for key phrase enrollment and/or detection, arranged in accordance with at least some implementations of the present disclosure. Process 1300 may include one or more operations 1301-1304 as illustrated in FIG. 13. Process 1300 may form at least part of a key phrase enrollment process and/or key phrase detection process performed, for example, by system 200 and/or system 1100. Furthermore, process 1300 will be described herein with reference to system 1400 of FIG. 14.

Figure 14:
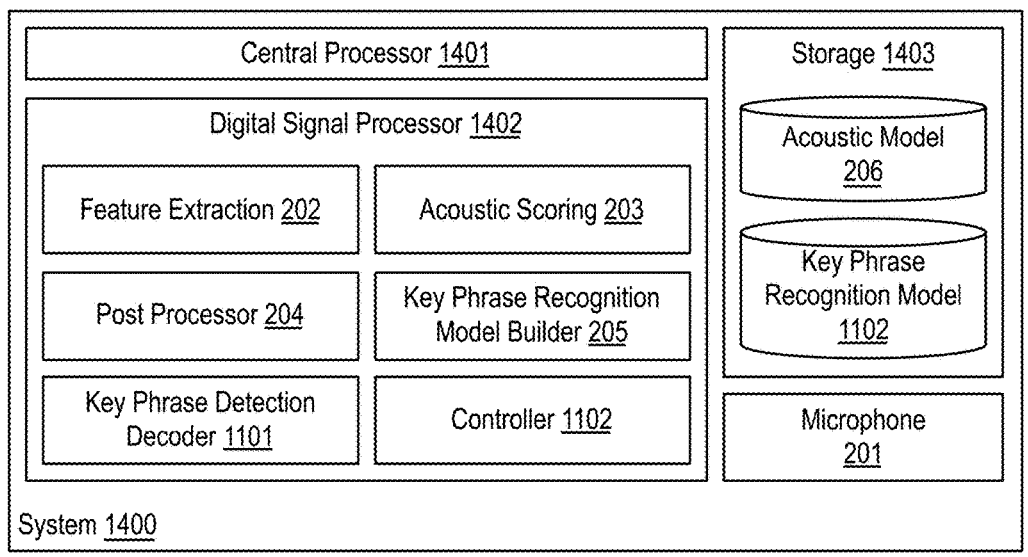
FIG. 14 is an illustrative diagram of an example system 1400 for performing key phrase enrollment and/or detection.

FIG. 14 is an illustrative diagram of an example system 1400 for performing key phrase enrollment and/or detection, arranged in accordance with at least some implementations of the present disclosure. As shown in FIG. 14, system 1400 may include a central processor 1401, a digital signal processor 1402, a storage 1403, and microphone 201. Also as shown, digital signal processor 1402 may include or implement feature extraction module 202, acoustic scoring module 203, post processor 204, key phrase recognition model builder 205, key phrase detection decoder 1101, and controller 1102. In some embodiments, digital signal processor 1402 may also include voice activity detection module 1103. Also as shown, storage 1403 may store acoustic model 206 and one or more key phrase rejection models 1102. Storage 1403 may also store audio data, input speech data, voice activity detection parameters or data, coefficient data, feature vectors, scores, output scores, rejection scores, key phrase scores, log likelihood scores, thresholds, or any other data or data structures as discussed herein.

Central processor 1401 and digital signal processor 1402 may include any number and type of processing units that may provide the operations as discussed herein. Such operations may be implemented via software or hardware or a combination thereof. For example, digital signal processor 1402 may include circuitry dedicated to manipulate data obtained from storage 1403 or dedicated memory. Furthermore, central processor 1401 may include any number and type of processing units or modules that may provide control and other high level functions for system 1400 as well as the operations as discussed herein. In the illustrated example, system 1400 may be configured to perform key phrase enrollment and/or detection.

Storage 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, storage 1403 may be implemented by cache memory. As shown, in an embodiment, feature extraction module 202, acoustic scoring module 203, post processor 204, key phrase recognition model builder 205, key phrase detection decoder 1101, and controller 1102 may be implemented via digital signal processor 1402. In another embodiment, feature extraction module 202, acoustic scoring module 203, post processor 204, key phrase recognition model builder 205, key phrase detection decoder 1101, and controller 1102 may be implemented via central processor 1401. In other embodiments, all or some or portions of feature extraction module 202, acoustic scoring module 203, post processor 204, key phrase recognition model builder 205, key phrase detection decoder 1101, and controller 1102 may be implemented via an execution unit (EU). The EU may include, for example, programmable logic or circuitry such as a logic core or cores that may provide a wide array of programmable logic functions.

Returning to discussion of FIG. 13, process 1300 may begin at operation 1301, where a user may select a user defined key phrase. For example, the user may select a user defined or user dependent key phrase from a list of options or the user may think of their own user defined or user dependent key phrase. Furthermore, as discussed, the user defined key phrase may be tied to an action or command to be performed by system 1400 such as a system wake action and/or an application based action or command (e.g., opening an application, executing an action in an application, or the like). In such contexts, the user may select an action or command (e.g., as provided to the user via a menu presented on a display or the like) and the user may provide the user defined key phrase such that the two may be associated. For example, during implementation, if the user defined key phrase is detected or recognized, system 1400 then performs the action or command selected by the user to correspond to that user defined key phrase.

Processing may continue at operation 1302, where a sequence of most probable audio units corresponding to a received audio input representing a user defined key phrase may be determined. For example, each audio unit of most probable audio units may corresponds to a frame of multiple frames of the audio input. For example, the audio units may include sub-phonetic units, silence audio units, noise audio units, or the like. The sequence of most probable audio units may be determined using any suitable technique or techniques. In an embodiment, feature extraction module 202 and acoustic scoring module 203 may determine the most probable audio units. In an embodiment, microphone 201 receives an utterance from a user and translates the received audio to audio data and feature extraction module 202 and acoustic scoring module 203 as implemented by digital signal processor 1402 determine the most probable audio units. In an embodiment, determining the sequence of most probable audio units corresponding to the received audio input includes extracting a feature vector for each frame of the received audio input to generate a time sequence of feature vectors and decoding the time sequence of feature vectors based on an acoustic model to determine the sequence of most probable audio units. In an embodiment, decoding the time sequence of feature vectors includes implementing a deep neural network such that the sequence of most probable audio units corresponds to a sequence of highest probability output nodes of the deep neural network determined based on the time sequence of feature vectors.

Processing may continue at operation 1303, where the sequence of most probable audio units may be processed to eliminate one or more audio units from the sequence of most probable audio units to generate a final sequence of audio units. The one or more audio units may be eliminated from the sequence of most probable audio units using any suitable technique or techniques. In an embodiment, post processor 204 as implemented by digital signal processor 1402 may eliminate the one or more audio units from the sequence of most probable audio units to generate the final sequence of audio units.

In an embodiment, processing the sequence of most probable audio units to eliminate at least one audio unit includes determining a first sub-phonetic audio unit of the sequence and a second sub-phonetic audio unit of the sequence immediately temporally following the first sub-phonetic audio unit match and eliminating the first or second sub-phonetic audio unit from the sequence of most probable audio units responsive to the first and second sub-phonetic audio unit matching. For example, sequential, identical or matching sub-phonetic audio units may be merged.

In an embodiment, processing the sequence of most probable audio units to eliminate at least one audio unit includes determining a first silence audio unit of the sequence, determining a number of silence audio units, if any, immediately temporally following the first silence audio unit, and eliminating the first silence audio unit and the immediately temporally following silence audio units, if any, in response to the total number consecutive of silence audio units not exceeding a threshold. For example, sequential silence audio units may only be kept when the number of them in a row meets or exceeds a threshold such as five or the like.

In an embodiment, processing the sequence of most probable audio units to eliminate at least one audio unit includes determining a number of sub-phonetic audio units are temporally between a first block of silence audio units and a second block of silence audio units of the sequence and eliminating the sub-phonetic audio units in response to the number sub-phonetic audio units temporally between the first and second blocks of silence audio units not exceeding a threshold. For example, a number of sub-phonetic audio units between blocks of silence units (e.g., blocks of five silence units or the like) may only be kept when the number of them meets or exceeds a threshold such as three or the like.

Processing may continue at operation 1304, where a key phrase recognition model representing the user defined key phrase may be generated based on the final sequence of audio units. For example, the key phrase evaluation model comprising a single rejection state having a transition to a key phrase model. The key phrase model includes multiple states having transitions therebetween with the states including a final state of the key phrase model and such that the states of the key phrase model correspond to the final sequence of audio units determined at operation 1303.

In some embodiments, a second final sequence of audio units corresponding to a second received audio input may be generated as discussed with respect to operations 1301-1303. In such embodiments, generating the key phrase recognition may include generating a key phrase recognition model having a second transition from the single rejection state to a second key phrase model. The second key phrase model may include multiple second states having second transitions therebetween with the multiple second states including a second final state of the second key phrase model such that the multiple second states of the second key phrase model correspond to the second final sequence of audio units. For example, the first and second audio inputs may represent different user defined key phrases (e.g., for different actions or commands by system 1400).

In some embodiments, a second final sequence of audio units corresponding to a second received audio input may be generated as discussed with respect to operations 1301-1303. In such embodiments, generating the key phrase recognition model may include generating a key phrase recognition model having a second transition from the single rejection state to a second key phrase model. The second key phrase model may include multiple second states having second transitions therebetween with the multiple second states including the final state of the key phrase model such that the final state is shared between the key phrase model and the second key phrase model and such that the multiple second states of the key phrase model correspond to the second final sequence of audio units. For example, the first and second audio inputs may represent the same user defined key phrase repeated for implementation in the same key phrase recognition model.

Operations 1301-1304 may provide for key phrase enrollment processing for a system such as system 1400. Operations 1301-1304 may be repeated for any number of key phrase recognition models. Furthermore, process 1300 may include an implementation phase or the like to provide key phrase detection by system 1400. In an embodiment, a second audio input is received for evaluation by the key phrase recognition model, a time series of scores of audio units is generated based on a time series of feature vectors representative of the second audio input, the key phrase recognition model is scored based on the time series of scores of audio units to generate a rejection likelihood score and a key phrase likelihood score, and a determination is made as to whether the second audio input corresponds to the user defined key phrase based on the rejection likelihood score and the key phrase likelihood score. For example, the rejection likelihood score may correspond to the single rejection state, the key phrase likelihood score may correspond to the final state of the key phrase model, and determining whether the second audio input corresponds to the user defined key phrase includes determining a log likelihood score based on the rejection likelihood score and the key phrase likelihood score and comparing the log likelihood score to a threshold. For example, if the key phrase likelihood score meets or exceeds the threshold, a determination may be made that the key phrase has been detected. In examples where multiple key phrase recognition models are used and/or where one or more key phrase recognition models have multiple final states corresponding to separate key phrases, a key phrase likelihood score may be generated for each instance and the key phrase likelihood scores may be compared to the same or different thresholds to determine whether any of the corresponding key phrases have been uttered.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
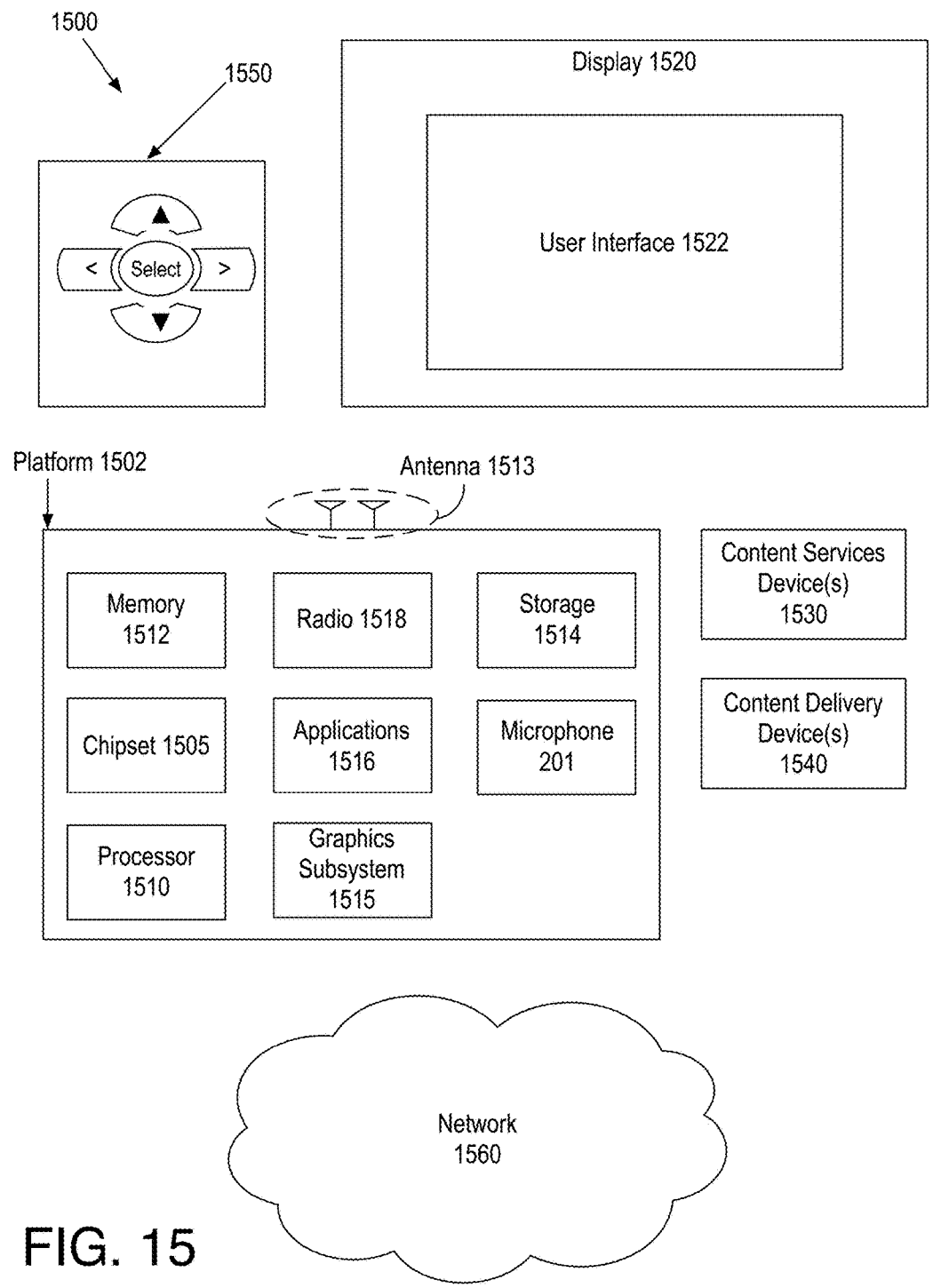
FIG. 15 is an illustrative diagram of an example system.

FIG. 15 is an illustrative diagram of an example system 1500, arranged in accordance with at least some implementations of the present disclosure. In various implementations, system 1500 may be a media system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1500 includes a platform 1502 coupled to a display 1520. Platform 1502 may receive content from a content device such as content services device(s) 1530 or content delivery device(s) 1540 or other similar content sources. As shown, in some examples, system 1500 may include microphone 201 implemented via platform 1502. Platform 1502 may receive input speech via microphone 201 as discussed herein. A navigation controller 1550 including one or more navigation features may be used to interact with, for example, platform 1502 and/or display 1520. Each of these components is described in greater detail below.

In various implementations, system 1500 may provide key phrase detection as described. For example, key phrase detection may be provide wake on voice capability for a device or environment as described. In other implementations, system 1500 may provide for generating a key phrase detection model (e.g., including an acoustic model, a rejection model, and a key phrase model). Such training may be performed offline prior to key phrase detection for example.

In various implementations, platform 1502 may include any combination of a chipset 1505, processor 1510, memory 1512, antenna 1513, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1515 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1515. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
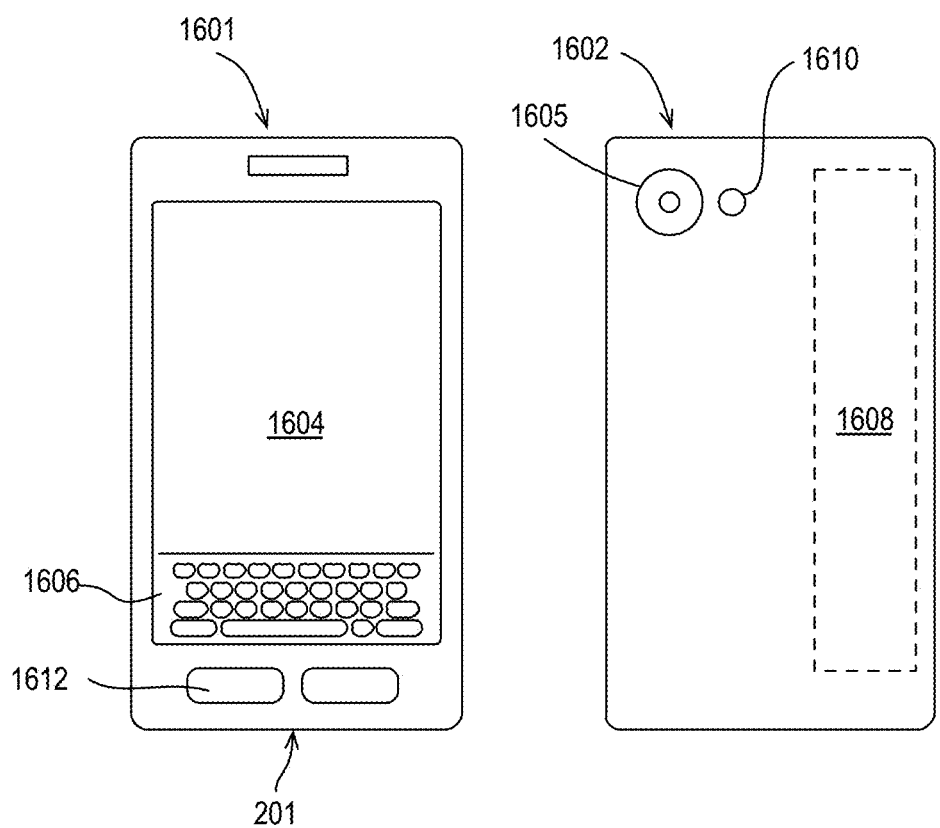
FIG. 16 illustrates an example device, all arranged in accordance with at least some implementations of the present disclosure.

As described above, system 1500 may be embodied in varying physical styles or form factors. FIG. 16 illustrates implementations of a small form factor device, arranged in accordance with at least some implementations of the present disclosure. In some examples, system 1500 may be implemented via device 1600. In other examples, other devices or systems, or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, and an integrated antenna 1608. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone 201, or may be digitized by a voice recognition device. As shown, device 1600 may include a camera 1605 (e.g., including a lens, an aperture, and an imaging sensor) and a flash 1610 integrated into back 1602 (or elsewhere) of device 1600.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for user dependent key phrase enrollment comprises determining a sequence of most probable audio units corresponding to a received audio input representing a user defined key phrase, wherein each audio unit of most probable audio units corresponds to a frame of a plurality of frames of the audio input, processing the sequence of most probable audio units to eliminate at least one audio unit from the sequence of most probable audio units to generate a final sequence of audio units, and generating a key phrase recognition model representing the user defined key phrase based on the final sequence of audio units, the key phrase recognition model comprising a single rejection state having a transition to a key phrase model, wherein the key phrase model comprises a plurality of states having transitions therebetween, the plurality of states including a final state of the key phrase model, wherein the plurality of states of the key phrase model correspond to the final sequence of audio units.

Further to the first embodiments, the audio units comprises at least one of a sub-phonetic unit or a silence audio unit.

Further to the first embodiments, processing the sequence of most probable audio units to eliminate at least one audio unit comprises determining a first sub-phonetic audio unit of the sequence and a second sub-phonetic audio unit of the sequence immediately temporally following the first sub-phonetic audio unit match and eliminating the first or second sub-phonetic audio unit from the sequence of most probable audio units responsive to the first and second sub-phonetic audio unit matching.

Further to the first embodiments, processing the sequence of most probable audio units to eliminate at least one audio unit comprises determining a first silence audio unit of the sequence, determining a number of silence audio units, if any, immediately temporally following the first silence audio unit, and eliminating the first silence audio unit and the immediately temporally following silence audio units, if any, in response to the total number consecutive of silence audio units not exceeding a threshold.

Further to the first embodiments, processing the sequence of most probable audio units to eliminate at least one audio unit comprises determining a number of sub-phonetic audio units are temporally between a first block of silence audio units and a second block of silence audio units of the sequence and eliminating the sub-phonetic audio units in response to the number sub-phonetic audio units temporally between the first and second blocks of silence audio units not exceeding a threshold.

Further to the first embodiments, the method further comprises generating a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units.

Further to the first embodiments, the method further comprises generating a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units, wherein the second received audio input represents a second user defined key phrase different than the user defined key phrase.

Further to the first embodiments, the method further comprises generating a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including the final state of the key phrase model shared with the second key phrase model, wherein the plurality of second states of the key phrase model correspond to the second final sequence of audio units.

Further to the first embodiments, determining the sequence of most probable audio units corresponding to the received audio input comprises extracting a feature vector for each frame of the received audio input to generate a time sequence of feature vectors and decoding the time sequence of feature vectors based on an acoustic model to determine the sequence of most probable audio units.

Further to the first embodiments, determining the sequence of most probable audio units corresponding to the received audio input comprises extracting a feature vector for each frame of the received audio input to generate a time sequence of feature vectors and decoding the time sequence of feature vectors based on an acoustic model to determine the sequence of most probable audio units, wherein decoding the time sequence of feature vectors comprises implementing a deep neural network, wherein the sequence of most probable audio units corresponds to a sequence of highest probability output nodes of the deep neural network determined based on the time sequence of feature vectors.

Further to the first embodiments, the method further comprises receiving a second audio input for evaluation by the key phrase recognition model, generating a time series of scores of audio units based on a time series of feature vectors representative of the second audio input, scoring the key phrase recognition model based on the time series of scores of audio units to generate a rejection likelihood score and a key phrase likelihood score, and determining whether the second audio input corresponds to the user defined key phrase based on the rejection likelihood score and the key phrase likelihood score.

Further to the first embodiments, the method further comprises receiving a second audio input for evaluation by the key phrase recognition model, generating a time series of scores of audio units based on a time series of feature vectors representative of the second audio input, scoring the key phrase recognition model based on the time series of scores of audio units to generate a rejection likelihood score and a key phrase likelihood score, and determining whether the second audio input corresponds to the user defined key phrase based on the rejection likelihood score and the key phrase likelihood score, wherein the rejection likelihood score corresponds to the single rejection state, the key phrase likelihood score corresponds to the final state of the key phrase model, and determining whether the second audio input corresponds to the user defined key phrase comprises determining a log likelihood score based on the rejection likelihood score and the key phrase likelihood score and comparing the log likelihood score to a threshold.

Further to the first embodiments, the method further comprises pruning an acoustic model by removing outputs not corresponding to the key phrase recognition model to generate a pruned acoustic model, wherein generating the time series of scores of audio units comprises implementing the pruned acoustic model.

In one or more second embodiments, a system for providing user dependent key phrase enrollment comprises a storage to store a received audio input and a key phrase recognition model and a processor coupled to the memory, the processor to determine a sequence of most probable audio units corresponding to the received audio input representing a user defined key phrase, wherein each audio unit of most probable audio units corresponds to a frame of a plurality of frames of the audio input, to process the sequence of most probable audio units to eliminate at least one audio unit from the sequence of most probable audio units to generate a final sequence of audio units, and to generate the key phrase recognition model representing the user defined key phrase based on the final sequence of audio units, the key phrase recognition model comprising a single rejection state having a transition to a key phrase model, wherein the key phrase model comprises a plurality of states having transitions therebetween, the plurality of states including a final state of the key phrase model, wherein the plurality of states of the key phrase model correspond to the final sequence of audio units.

Further to the second embodiments, the audio units comprises at least one of a sub-phonetic unit or a silence audio unit.

Further to the second embodiments, to process the sequence of most probable audio units to eliminate at least one audio unit comprises the processor to determine a first sub-phonetic audio unit of the sequence and a second sub-phonetic audio unit of the sequence immediately temporally following the first sub-phonetic audio unit match and to eliminate the first or second sub-phonetic audio unit from the sequence of most probable audio units responsive to the first and second sub-phonetic audio unit matching.

Further to the second embodiments, to process the sequence of most probable audio units to eliminate at least one audio unit comprises the processor to determine a first silence audio unit of the sequence, to determine a number of silence audio units, if any, immediately temporally following the first silence audio unit, and to eliminate the first silence audio unit and the immediately temporally following silence audio units, if any, in response to the total number consecutive of silence audio units not exceeding a threshold.

Further to the second embodiments, to process the sequence of most probable audio units to eliminate at least one audio unit comprises the processor to determine a number of sub-phonetic audio units are temporally between a first block of silence audio units and a second block of silence audio units of the sequence and to eliminate the sub-phonetic audio units in response to the number sub-phonetic audio units temporally between the first and second blocks of silence audio units not exceeding a threshold.

Further to the second embodiments, the processor is further to generate a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units.

Further to the second embodiments, the processor is further to generate a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units, wherein the second received audio input represents a second user defined key phrase different than the user defined key phrase.

Further to the second embodiments, the processor is further to generate a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including the final state of the key phrase model shared with the second key phrase model, wherein the plurality of second states of the key phrase model correspond to the second final sequence of audio units.

Further to the second embodiments, the processor to determine the sequence of most probable audio units corresponding to the received audio input comprises the processor to extract a feature vector for each frame of the received audio input to generate a time sequence of feature vectors and decode the time sequence of feature vectors based on an acoustic model to determine the sequence of most probable audio units.

Further to the second embodiments, the processor to decode the time sequence of feature vectors comprises the processor to implement a deep neural network, wherein the sequence of most probable audio units corresponds to a sequence of highest probability output nodes of the deep neural network determined based on the time sequence of feature vectors.

Further to the second embodiments, the processor is further to receive a second audio input for evaluation by the key phrase recognition model, to generate a time series of scores of audio units based on a time series of feature vectors representative of the second audio input, to score the key phrase recognition model based on the time series of scores of audio units to generate a rejection likelihood score and a key phrase likelihood score, and to determine whether the second audio input corresponds to the user defined key phrase based on the rejection likelihood score and the key phrase likelihood score.

Further to the second embodiments, the rejection likelihood score corresponds to the single rejection state, the key phrase likelihood score corresponds to the final state of the key phrase model, and the processor to determine whether the second audio input corresponds to the user defined key phrase comprises the processor to determine a log likelihood score based on the rejection likelihood score and the key phrase likelihood score and to compare the log likelihood score to a threshold.

Further to the second embodiments, the processor is further to prune an acoustic model by removing outputs not corresponding to the key phrase recognition model to generate a pruned acoustic model, wherein the processor to generate the time series of scores of audio units comprises the processor to implement the pruned acoustic model.

In one or more third embodiments, a system comprises means for determining a sequence of most probable audio units corresponding to a received audio input representing a user defined key phrase, wherein each audio unit of most probable audio units corresponds to a frame of a plurality of frames of the audio input, means for processing the sequence of most probable audio units to eliminate at least one audio unit from the sequence of most probable audio units to generate a final sequence of audio units, and means for generating a key phrase recognition model representing the user defined key phrase based on the final sequence of audio units, the key phrase recognition model comprising a single rejection state having a transition to a key phrase model, wherein the key phrase model comprises a plurality of states having transitions therebetween, the plurality of states including a final state of the key phrase model, wherein the plurality of states of the key phrase model correspond to the final sequence of audio units.

Further to the third embodiments, the means for processing the sequence of most probable audio units to eliminate at least one audio unit comprise means for determining a first sub-phonetic audio unit of the sequence and a second sub-phonetic audio unit of the sequence immediately temporally following the first sub-phonetic audio unit match and means for eliminating the first or second sub-phonetic audio unit from the sequence of most probable audio units responsive to the first and second sub-phonetic audio unit matching.

Further to the third embodiments, the means for processing the sequence of most probable audio units to eliminate at least one audio unit comprise means for determining a first silence audio unit of the sequence, means for determining a number of silence audio units, if any, immediately temporally following the first silence audio unit, and means for eliminating the first silence audio unit and the immediately temporally following silence audio units, if any, in response to the total number consecutive of silence audio units not exceeding a threshold.

Further to the third embodiments, the means for processing the sequence of most probable audio units to eliminate at least one audio unit comprise means for determining a number of sub-phonetic audio units are temporally between a first block of silence audio units and a second block of silence audio units of the sequence and means for eliminating the sub-phonetic audio units in response to the number sub-phonetic audio units temporally between the first and second blocks of silence audio units not exceeding a threshold.

Further to the third embodiments, the system further comprises means for generating a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units.

Further to the third embodiments, the system further comprises means for generating a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including the final state of the key phrase model shared with the second key phrase model, wherein the plurality of second states of the key phrase model correspond to the second final sequence of audio units.

In one or more fourth embodiments, at least one machine readable medium comprises a plurality of instructions that, in response to being executed on a computing device, cause the computing device to provide user dependent key phrase enrollment by determining a sequence of most probable audio units corresponding to a received audio input representing a user defined key phrase, wherein each audio unit of most probable audio units corresponds to a frame of a plurality of frames of the audio input, processing the sequence of most probable audio units to eliminate at least one audio unit from the sequence of most probable audio units to generate a final sequence of audio units, and generating a key phrase recognition model representing the user defined key phrase based on the final sequence of audio units, the key phrase recognition model comprising a single rejection state having a transition to a key phrase model, wherein the key phrase model comprises a plurality of states having transitions therebetween, the plurality of states including a final state of the key phrase model, wherein the plurality of states of the key phrase model correspond to the final sequence of audio units.

Further to the fourth embodiments, processing the sequence of most probable audio units to eliminate at least one audio unit comprises determining a first sub-phonetic audio unit of the sequence and a second sub-phonetic audio unit of the sequence immediately temporally following the first sub-phonetic audio unit match and eliminating the first or second sub-phonetic audio unit from the sequence of most probable audio units responsive to the first and second sub-phonetic audio unit matching.

Further to the fourth embodiments, processing the sequence of most probable audio units to eliminate at least one audio unit comprises determining a first silence audio unit of the sequence, determining a number of silence audio units, if any, immediately temporally following the first silence audio unit, and eliminating the first silence audio unit and the immediately temporally following silence audio units, if any, in response to the total number consecutive of silence audio units not exceeding a threshold.

Further to the fourth embodiments, processing the sequence of most probable audio units to eliminate at least one audio unit comprises determining a number of sub-phonetic audio units are temporally between a first block of silence audio units and a second block of silence audio units of the sequence and eliminating the sub-phonetic audio units in response to the number sub-phonetic audio units temporally between the first and second blocks of silence audio units not exceeding a threshold.

Further to the fourth embodiments, the machine readable medium further comprises instructions that, in response to being executed on the computing device, cause the computing device to provide user dependent key phrase enrollment by generating a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units.

Further to the fourth embodiments, the machine readable medium further comprises instructions that, in response to being executed on the computing device, cause the computing device to provide user dependent key phrase enrollment by generating a second final sequence of audio units corresponding to a second received audio input, wherein the key phrase recognition model further comprises a second transition from the single rejection state to a second key phrase model, wherein the second key phrase model comprises a plurality of second states having second transitions therebetween, the plurality of second states including the final state of the key phrase model shared with the second key phrase model, wherein the plurality of second states of the key phrase model correspond to the second final sequence of audio units.

In one or more fifth embodiments, at least one machine readable medium may include a plurality of instructions that, in response to being executed on a computing device, cause the computing device to perform a method or any functions according to any one of the above embodiments.

In one or more sixth embodiments, an apparatus or a system may include means for performing a method or any functions according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for user dependent key phrase enrollment comprising:
   receiving, via a microphone, an audio input representing a user defined key phrase and converting the audio input to received audio data representative of the audio input;
   determining a sequence of most probable audio units corresponding to the received audio data, wherein each audio unit of most probable audio units corresponds to a frame of a plurality of frames of the audio data;
   processing the sequence of most probable audio units to eliminate at least one audio unit from the sequence of most probable audio units to generate a final sequence of audio units by
      determining a first silence audio unit of the sequence and a number of silence audio units immediately temporally following the first silence audio unit,
      wherein the first silence audio unit and the number of silence audio units are between non-silence audio units of the sequence, and
      eliminating the first silence audio unit and the immediately temporally following silence audio units in response to the total number of consecutive silence audio units not exceeding a threshold;
   generating a key phrase recognition model representing the user defined key phrase based on the final sequence of audio units, the key phrase recognition model comprising a single start state based rejection model, a key phrase model, and a transition from the single start state based rejection model to the key phrase model,
   wherein the single start state based rejection model includes a single rejection state having a plurality of rejection model self loops, wherein the key phrase model comprises a plurality of states having transitions therebetween, the plurality of states including a final state of the key phrase model, and wherein the plurality of states of the key phrase model correspond to the final sequence of audio units;
   receiving a further audio input for evaluation by the key phrase recognition model;
   generating a time series of scores of audio units based on a time series of feature vectors representative of the further audio input;
   scoring the key phrase recognition model based on the time series of scores of audio units to generate a rejection likelihood score and a key phrase likelihood score; and
   recognizing that the further audio input corresponds to the user defined key phrase based on the rejection likelihood score and the key phrase likelihood score.

2. The method of claim 1, wherein processing the sequence of most probable audio units to eliminate at least one audio unit comprises determining a first sub-phonetic audio unit of the sequence and a second sub-phonetic audio unit of the sequence immediately temporally following the first sub-phonetic audio unit match and eliminating the first or second sub-phonetic audio unit from the sequence of most probable audio units responsive to the first and second sub-phonetic audio unit matching.

3. The method of claim 1, wherein processing the sequence of most probable audio units to eliminate at least one audio unit comprises determining a number of non-silence sub-phonetic audio units are temporally between a first block of silence audio units and a second block of silence audio units of the sequence and eliminating the non-silence sub-phonetic audio units in response to the number of non-silence sub-phonetic audio units, temporally between the first and second blocks of silence audio units, not exceeding a threshold.

4. The method of claim 1, further comprising generating a second final sequence of audio units corresponding to a second received audio input, wherein the key phrase recognition model further comprises a second transition from the single start state based rejection model to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units.

5. The method of claim 4, wherein the second received audio input represents a second user defined key phrase different than the user defined key phrase.

6. The method of claim 1, further comprising generating a second final sequence of audio units corresponding to a second received audio input, wherein the key phrase recognition model further comprises a second transition from the single start state based rejection model to a second key phrase model, wherein the second key phrase model comprises a plurality of second states having second transitions therebetween, the plurality of second states including the final state of the key phrase model shared with the second key phrase model, wherein the plurality of second states of the second key phrase model correspond to the second final sequence of audio units.

7. The method of claim 1, wherein determining the sequence of most probable audio units corresponding to the received audio data comprises:
   extracting a feature vector for each frame of the received audio data to generate a time sequence of feature vectors; and
   decoding the time sequence of feature vectors based on an acoustic model to determine the sequence of most probable audio units.

8. The method of claim 7, wherein decoding the time sequence of feature vectors comprises implementing a deep neural network, wherein the sequence of most probable audio units corresponds to a sequence of highest probability output nodes of the deep neural network determined based on the time sequence of feature vectors.

9. The method of claim 1, wherein
   the rejection likelihood score corresponds to the single start state based rejection model,
   the key phrase likelihood score corresponds to the final state of the key phrase model, and
   determining whether the further audio input corresponds to the user defined key phrase comprises
      determining a log likelihood score based on the rejection likelihood score and the key phrase likelihood score and
      comparing the log likelihood score to a threshold.

10. The method of claim 1, further comprising:
   pruning an acoustic model by removing outputs not corresponding to the key phrase recognition model to generate a pruned acoustic model,
   wherein generating the time series of scores of audio units comprises implementing the pruned acoustic model.

11. A system for providing user dependent key phrase enrollment comprising:
   a microphone to receive an audio input representing a user defined key phrase and to convert the audio input to received audio data representative of the audio input;
   a memory to store the received audio input and a key phrase recognition model; and
   a processor coupled to the memory,
   the processor:
   to determine a sequence of most probable audio units corresponding to the received audio data, wherein each audio unit of the most probable audio units corresponds to a frame of a plurality of frames of the audio data,
   to process the sequence of most probable audio units to eliminate at least one audio unit from the sequence of most probable audio units to generate a final sequence of audio units by the processor to determine a first silence audio unit of the sequence and a number of silence audio units immediately temporally following the first silence audio unit, wherein the first silence audio unit and the number of silence audio units are between non-silence audio units of the sequence, and to eliminate the first silence audio unit and the immediately temporally following silence audio units in response to the total number of consecutive silence audio units not exceeding a threshold, and
   to generate the key phrase recognition model representing the user defined key phrase based on the final sequence of audio units, the key phrase recognition model comprising a single start state based rejection model, a key phrase model, and a transition from the single start state based rejection model to the key phrase model, wherein the single start state based rejection model includes a single rejection state having a plurality of rejection model self loops, wherein the key phrase model comprises a plurality of states having transitions therebetween, the plurality of states including a final state of the key phrase model, and wherein the plurality of states of the key phrase model correspond to the final sequence of audio units,
   wherein the microphone receives a further audio input for evaluation by the key phrase recognition model,
   the processor further:
   to generate a time series of scores of audio units based on a time series of feature vectors representative of the further audio input,
   to score the key phrase recognition model based on the time series of scores of audio units to generate a rejection likelihood score and a key phrase likelihood score, and
   to recognize that the further audio input corresponds to the user defined key phrase based on the rejection likelihood score and the key phrase likelihood score.

12. The system of claim 11, wherein to process the sequence of most probable audio units to eliminate at least one audio unit comprises the processor to determine a first sub-phonetic audio unit of the sequence and a second sub-phonetic audio unit of the sequence immediately temporally following the first sub-phonetic audio unit match and to eliminate the first or second sub-phonetic audio unit from the sequence of most probable audio units responsive to the first and second sub-phonetic audio unit matching.

13. The system of claim 11, wherein to process the sequence of most probable audio units to eliminate at least one audio unit comprises the processor to determine a number of non-silence sub-phonetic audio units are temporally between a first block of silence audio units and a second block of silence audio units of the sequence and to eliminate the non-silence sub-phonetic audio units in response to the number of non-silence sub-phonetic audio units, temporally between the first and second blocks of silence audio units, not exceeding a threshold.

14. The system of claim 11, the processor further to generate a second final sequence of audio units corresponding to a second received audio input, wherein the key phrase recognition model further comprises a second transition from the single start state based rejection model to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units.

15. The system of claim 11, the processor further to generate a second final sequence of audio units corresponding to a second received audio input, wherein the key phrase recognition model further comprises a second transition from the single start state based rejection model to a second key phrase model, wherein the second key phrase model comprises a plurality of second states having second transitions therebetween, the plurality of second states including the final state of the key phrase model shared with the second key phrase model, wherein the plurality of second states of the second key phrase model correspond to the second final sequence of audio units.

16. At least one non-transitory machine readable medium comprising a plurality of instructions that, in response to being executed on a computing device, cause the computing device to provide user dependent key phrase enrollment by:
receiving, via a microphone, an audio input representing a user defined key phrase and converting the audio input to received audio data representative of the audio input;
determining a sequence of most probable audio units corresponding to the received audio data, wherein each audio unit of the most probable audio units corresponds to a frame of a plurality of frames of the audio data;
processing the sequence of most probable audio units to eliminate at least one audio unit from the sequence of most probable audio units to generate a final sequence of audio units by determining a first silence audio unit of the sequence and a number of silence audio units immediately temporally following the first silence audio unit, wherein the first silence audio unit and the number of silence audio units are between non-silence audio units of the sequence, and eliminating the first silence audio unit and the immediately temporally following silence audio units in response to the total number of consecutive silence audio units not exceeding a threshold;
generating a key phrase recognition model representing the user defined key phrase based on the final sequence of audio units, the key phrase recognition model comprising a single start state based rejection model, a key phrase model, and a transition from the single start state based rejection model to the key phrase model, wherein the single start state based rejection model includes a single rejection state having a plurality of rejection model self loops, wherein the key phrase model comprises a plurality of states having transitions therebetween, the plurality of states including a final state of the key phrase model, and wherein the plurality of states of the key phrase model correspond to the final sequence of audio units;
receiving a further audio input for evaluation by the key phrase recognition model;
generating a time series of scores of audio units based on a time series of feature vectors representative of the further audio input;
scoring the key phrase recognition model based on the time series of scores of audio units to generate a rejection likelihood score and a key phrase likelihood score; and
recognizing that the further audio input corresponds to the user defined key phrase based on the rejection likelihood score and the key phrase likelihood score.

17. The machine readable medium of claim 16, wherein processing the sequence of most probable audio units to eliminate at least one audio unit comprises determining a first sub-phonetic audio unit of the sequence and a second sub-phonetic audio unit of the sequence immediately temporally following the first sub-phonetic audio unit match and eliminating the first or second sub-phonetic audio unit from the sequence of most probable audio units responsive to the first and second sub-phonetic audio unit matching.

18. The machine readable medium of claim 16, wherein processing the sequence of most probable audio units to eliminate at least one audio unit comprises determining a number of non-silence sub-phonetic audio units are temporally between a first block of silence audio units and a second block of silence audio units of the sequence and eliminating the non-silence sub-phonetic audio units in response to the number of non-silence sub-phonetic audio units, temporally between the first and second blocks of silence audio units, not exceeding a threshold.

19. The machine readable medium of claim 16, further comprising instructions that, in response to being executed on the computing device, cause the computing device to provide user dependent key phrase enrollment by:
generating a second final sequence of audio units corresponding to a second received audio input, wherein the key phrase recognition model further comprises a second transition from the single start state based rejection model to a second key phrase model, wherein the second key phrase model comprises a plurality of second states having second transitions therebetween, the plurality of second states including a second final state of the second key phrase model, wherein the plurality of second states of the second key phrase model correspond to the second final sequence of audio units.

20. The machine readable medium of claim 16, further comprising instructions that, in response to being executed on the computing device, cause the computing device to provide user dependent key phrase enrollment by:
generating a second final sequence of audio units corresponding to a second received audio input, wherein the key phrase recognition model further comprises a second transition from the single start based rejection state model to a second key phrase model, wherein the second key phrase model comprises a plurality of second states having second transitions therebetween, the plurality of second states including the final state of the key phrase model shared with the second key phrase model, wherein the plurality of second states of the second key phrase model correspond to the second final sequence of audio units.

* * * * *